(12) United States Patent
Yamamoto et al.

(10) Patent No.: US 7,064,912 B2
(45) Date of Patent: Jun. 20, 2006

(54) LENS DRIVING APPARATUS, THIN CAMERA, AND A CELLULAR PHONE HAVING A THIN CAMERA

(75) Inventors: Toshio Yamamoto, Nagano (JP); Noboru Otsuki, Nagano (JP); Yoshifusa Miyasaka, Nagano (JP); Yuji Fujita, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 187 days.

(21) Appl. No.: 10/685,548

(22) Filed: Oct. 15, 2003

(65) Prior Publication Data

US 2004/0207936 A1      Oct. 21, 2004

(30) Foreign Application Priority Data

Apr. 17, 2003  (JP)  ............................. 2003-112954
May 22, 2003  (JP)  ............................. 2003-145319

(51) Int. Cl.
*G02B 7/02*   (2006.01)
*G02B 15/14*  (2006.01)

(52) U.S. Cl. ...................... 359/824; 359/696; 359/823
(58) Field of Classification Search ................ 359/696, 359/697, 823, 824, 694
See application file for complete search history.

(56) References Cited

U.S. PATENT DOCUMENTS

| | | | | | |
|---|---|---|---|---|---|
| 4,695,144 | A | * | 9/1987 | Yoshino et al. | 396/132 |
| 4,874,233 | A | * | 10/1989 | Yamomoto et al. | 359/703 |
| 5,592,250 | A | * | 1/1997 | Shimizu | 396/79 |
| 5,926,322 | A | * | 7/1999 | Iwasaki | 359/694 |

FOREIGN PATENT DOCUMENTS

| | | | |
|---|---|---|---|
| JP | 04217217 A | * | 8/1992 |
| JP | 09-106314 | | 4/1997 |
| JP | 10-142472 | | 5/1998 |
| JP | 10-150759 | | 6/1998 |

* cited by examiner

*Primary Examiner*—David N. Spector
(74) *Attorney, Agent, or Firm*—Reed Smith LLP

(57) ABSTRACT

A lens driving apparatus includes a lens holder and a driver for providing linear motion to the lens holder along an optical axis of the lens. The driver includes an electromagnetic mechanism, provided at the outer circumference of the lens holder in an enclosing manner, for generating a torque around the optical axis; and a switching mechanism for switching the generated torque to a linear driving force along the optical axis so as to linearly move the lens holders. The driver surrounds the lens holder along the outer circumference to allow a smaller sized lens driving apparatus than that where the lens holder is at a side of the lens driving apparatus. In addition, the switching mechanism prevents the lens holder from moving in the optical axial direction, when power is turned off or even when an external force is applied to the lens holder.

14 Claims, 11 Drawing Sheets

Zooming mode

Standard mode

Wide angle mode

LENS DRIVING APPARATUS, THIN CAMERA, AND A CELLULAR PHONE HAVING A THIN CAMERA

CROSS-REFERENCE TO RELATED APPLICATIONS

This application claims priority to Japanese patent applications Nos. 2003-112954, filed Apr. 17, 2003 and 2003-145319, filed May 22, 2003, which are incorporated herein by reference.

TECHNICAL FIELD

The present invention relates to a lens driving apparatus, a thin camera, and a cellular phone having a thin camera. More specifically, it relates to a technology that drives and holds a lens in the optical axial direction.

RELATED ART

In a thin camera built into a cellular phone a lens can travel only a short distance for zooming for image capturing. A popular lens driving apparatus of the magnetically driven type has the following characteristics: the lens driving apparatus is constructed with a cylindrical lens holder holding a lens; a ring-like rotor magnet attached onto the outer circumference of the lens holder; and a driving coil facing the rotor magnet. In this configuration, conduction of the driving coil is controlled to let the lens holder directly make linear motion in an optical axial direction without using a switching mechanism, thereby magnetically holding the lens holder at the destination (See Patent Publication 1).

Alternately, another popular configuration adopts a switching mechanism for switching a motor torque into linear motion utilizing guiding shafts for guiding a lens holder in an optical axial direction (See Patent Publications 2 and 3 for examples).

Patent Publication 1

Japanese Laid-open patent application No. H10-150759 (p.p. 3–5, FIGS. 1–3).

Patent Publication 2

Japanese Laid-open patent application No. H09-106314 (FIG. 1).

Patent Publication 3

Japanese Laid-open patent application No. H10-142472 (Abstract).

Nonetheless, in the lens driving apparatus of conventional technology described in Patent Publication 1, it is the driving coil that is electrically excited to hold the lens holders, therefore, once conductance (power supply) is lost, the lens holder no longer holds the lens thereon. This is a problem in that the external force or vibration displaces the lens when power is turned off. Yet, a constant power supply consumes too much power to make the lens driving apparatus cost effective, which disqualifies the lens driving apparatus for the use in portable devices such as a cellular phones.

Further, in the lens driving apparatus of conventional technology described in Patent Publication 1, the lens holder does not guide the lens very well. This causes inaccurate positioning of a lens, particularly in a circumferential direction. It also causes poor leveling as well. In addition, it is the driving coil that is electrically excited to hold the lens holder. In other words, the coil does not hold the lens holders when power is turned off. This is a problem in that the external force or vibration causes the lens to be displaced when conduction is interrupted. Yet, a constant power supply consumes too much power to make the lens driving apparatus cost effective, which disqualifies itself for use in portable devices such as cellular phones.

In the case of a lens driving mechanism which converts a torque into linear motion, as described in Patent Publications 2 or 3, the force transfer mechanism or switching mechanism required between the motor mechanism and the lens holder becomes complicated, causing inefficiency in assembly and requiring enlargement of the system installing the lens driving mechanism.

In light of the above problems, the object of the present invention is to provide a lens driving apparatus capable of holding a lens when electrical conduction (power supply) is terminated and is capable of being made in a smaller size.

SUMMARY OF THE INVENTION

To overcome the above problems, the present invention provides a lens driving apparatus comprising: a lens holder for holding a lens; a driving means for providing linear motion to the lens holder along the optical axis of the lens. The driving means further comprises: an electromagnetic mechanism, provided at the outer circumference of the lens holder in an enclosing manner, for generating a torque around the optical axis; and a switching mechanism for switching the torque generated by the electromagnetic mechanism to a linear driving force along the optical axis so as to linearly move the lens holders.

In the present invention, the driving means surrounds the lens holder along the outer circumference, which provides an advantage in that the lens driving apparatus of the present invention requires a smaller lens driving apparatus than that required for a lens driving apparatus having a lens holder at a side thereof. In addition, the switching mechanism of the present invention switches the torque generated by the electromagnetic mechanism to a linear driving force along the optical axis. As a result, even though an external force is applied to the lens holder when power supply to the electromagnetic mechanism is discontinued, the switching mechanism prevents the lens holder from moving in the optical axial direction. The lens holder is thus kept at a given position without supplying power to the electromagnetic mechanism.

In the present invention, the lens may be provided in a single or multiple pieces. Multiple lenses may be held in a common holder. Alternately, each of the lenses may be held in a separate holder. It is desirable, though, when each of the lenses are held in a separate holder, that each of the lens holders is arranged in the optical axial direction of each lens and provided with separate switching mechanisms such that each of the lenses can make different motions.

It is further desirable in the present invention that the electromagnetic mechanism comprises a rotor having a motor mechanism with a ring-like magnet whose outer circumference is magnetized in a circumferential direction, which is a stepping motor mechanism; and a stator, provided with multiple magnetic poles facing the outer circumference of the ring-like magnet. In this configuration, the detent-torque acting on the point between the stator and the rotor also prevents the lens holders from being displaced by an external force in the optical axial direction. The lens holders are thus correctly kept at a given position without supplying power to the electromagnetic mechanism. The position of the lens, which is in the optical axial direction, can be accurately controlled only by controlling the number of steps of the stator upon power supply.

It is desirable that the rotor of the present invention further comprises: a guiding channel, provided on one of the lens holder's outer circumference and the rotor's inner circumference; and an engagement means, which is held at the other of the lens holder's outer circumference and the rotor's inner circumference, being inserted to the guiding channel to provide a relative linear motion to the lens holder in the optical axial direction along the guiding channel as the rotor rotates. The lens can thus be moved in the optical axial direction without rotating around the optical axis. The lens holder is configured in such a manner that it makes linear motion via the engagement means that relatively moves within the guiding channel, which allows optimization of the amount the lens holder moves or enhances the positioning accuracy of the lens holder in the optical axial direction only by an adjustment of the angle of inclination of the guiding channel with respect to the optical axis.

In this invention, when multiple lens holders are arranged in the optical axial direction holding the lenses, it is desirable that a switching mechanism is provided for each of the multiple lens holders.

Regarding the above configuration, it is desirable that the switching mechanisms corresponding to different lens holders are given guiding channels of different patterns. This allows different lenses to make different motions.

In the present invention, the rotor is integrally formed with the lens holder. It is desirable that the switching mechanism further comprises: a guiding channel, provided on one of the lens holder's outer circumference and the rotor's inner circumference; and an engagement means, which is held at the other of the lens holder's outer circumference and the rotor's inner circumference, being inserted to the guiding channel to provide a relative linear motion to the lens holder in the optical axial direction along the guiding channel as the rotor rotates. This configuration in which a rotor and the lens holder is integrally formed allows the manufacturer to reduce the number of components and assembly steps required for manufacturing the apparatus.

Further in the present invention, it is desirable that the engagement means is spherical rotatably held by the surface not selected previously for the guiding channel. This configuration allows the spherical ball to act as a bearing, thereby allowing the lens holder to efficiently move in a linear fashion.

To overcome the above problems, the present invention provides a lens driving apparatus comprising: a lens holder holding a lens; a driving means for providing a linear motion to the lens holder along the optical axis of the lens. The driving means—an electromagnetic mechanism, surrounding the outer circumference of the lens holder for generating a driving force required for lefting the lens holder make linear motion along the optical axial direction; and a guiding shaft for guiding the linear motion of the lens holder along the optical axis by limiting the degree of inclination of the lens holders along the optical axis.

In the present invention, the driving means surrounds the lens holder along the outer circumference, which provides an advantage in that the lens driving apparatus of the present invention is smaller than a lens driving apparatus lens driving apparatus having a lens holder at a side thereof. Moreover, the presence of the guiding shaft enhances the accuracy of lens positioning, particularly in a circumferential direction, consequently improving accuracy of leveling of the lens. Further, the guiding shaft that guides the lens holders is arranged in the inner space surrounded by the electromagnetic mechanism, that is, the lens holder portion is located between the electromagnetic mechanism and the lens, and the size of the lens driving apparatus can be greatly reduced in a radial direction.

Another embodiment of the present invention is further characterized by: in addition to the lens driving apparatus described above, the lens holder makes linear motion simultaneously guided by two guiding shafts. The engagement portion has a sliding portion that slides the guiding shaft in the optical direction wherein one sliding portion is made longer than the other portion in the optical axial direction. There are two guiding shafts in this invention, which is unlikely to cause complications of twisting or displacement of the lens holder, consequently preventing the lens holder from falling. The lens thus makes linear motion parallel to its optical axis.

It is also desirable that the lens holder is provided with an escaping portion cut out on the lens holder on the inner portion in a radial direction to accommodate the long sliding portion guiding the lens holder where the guiding shaft that is not guiding the lens holder is inserted therein. In this configuration, the long sliding portion can escape in an escaping portion, which makes it easier to shrink the holder size. In addition, a space is provided around the shaft that is not guiding other lens holders, thus clearing the way for other two guiding shafts.

It is desirable that the present invention further comprises: two lens holders, that are arranged in parallel with the optical axis of the respective lenses; and three of the guiding shafts are circumferentially arranged evenly wherein the two lens holders are guided by a total of two guiding shafts, namely, one common guiding shaft and another guiding shaft. In this configuration, three guiding shafts are arranged in a well balanced manner, allowing effective use of the space therein. Guiding by two guiding shafts also prevents guiding holders from unwanted rotation and ensures a smooth linear motion thereof.

Further, the driving means comprises: an electromagnetic mechanism, provided at an outer circumference of the lens holder in an enclosing manner, for generating a torque around the optical axis; and a switching mechanism for switching a torque generated by the electromagnetic mechanism to linear motion along the optical axis; wherein the switching mechanism having the guiding shafts is arranged within the space surrounded by the electromagnetic mechanism. In this invention, a switching mechanism mechanically switches the torque generated by the electromagnetic mechanism to a linear motion along the optical axis. In this way, even through an external force is applied to the lens holder in the optical axial direction when power is turned off, the switching mechanism mechanically prevents the lens holder from moving in the optical axial direction. In addition, the switching mechanism is arranged between the electromagnetic mechanism and the lenses in the space surrounded by the electromagnetic mechanism, the size of the lens driving apparatus can thus be reduced in a radial direction.

Moreover, the electromagnetic mechanism comprises: a rotor, whose outer circumference is provided with a ring-like magnet magnetized circumferentially in a S/N alternating manner; and a stator, having multiple poles circumferentially arranged to face the outer circumference of the ring-like magnet; the switching mechanism being held by an engagement means at one end, which is one of said lens holder's outer circumference and said rotor's inner circumference and the other end, which is the other of said lens holder's outer circumference and rotor's inner circumference wherein said electromagnetic mechanism further comprises a projection portion for linearly moving the lens holder along the optical axis of the lens by relatively moving within the guiding channel. In this configuration, a detent torque, acting at a point between the stator and rotor, prevents the lens holder from moving in the optical axial direction as an external force is applied thereto. The lens holder is thus secured at a given point without supplying power thereto. The use of a motor for the electromagnetic mechanism allows positioning of the lens in the optical axial direction only by controlling the number of steps of the stator upon power supply. Moreover, this switching mechanism has such a simple mechanism that it can move the lens holder in the optical axial direction without rotating the lens around the optical axis. The lens holder makes linear motion along with a projection being guided by a guiding channel. This allows optimization of the amount the lens holder travels or enhances the positioning accuracy of the lens holder in the optical axial direction only by an adjustment of the angle of inclination of the guiding channel with respect to the optical axis.

It is further desirable that the projection is provided in the vicinity of the engagement portion. This minimizes the distance between the projection guided by the guiding channel and the engagement portion guided by the guiding shafts, thereby minimizing interference between the two guiding motions.

It is further desirable that the long sliding portion is provided in such a manner that it projects in the space between two lens holders. The switching mechanism changes the distance between the lenses held by the two lens holders. The long sliding portion can go into the escaping portion corresponding to each of the long sliding portions when the distance between the lenses is narrowed and leave a space between the outer circumferences of the long sliding portions and the inner circumference of the escaping portion. This configuration also provides a smooth lens guide, when a zooming mechanism is adopted, thereby allowing size reduction of the zooming mechanism.

Yet in another lens driving apparatus of the present invention, the lens and the lens holder are integrally molded utilizing a resin; the lens is an aspherical resin lens; a part of the lens holder providing an engagement portion. This configuration enhances precision of assembly, required for the lens holder that must stay on a plane perpendicular to both the guiding shaft and the optical axis during their respective linear motions.

The thin camera of the present invention comprises: a cover glass secured toward the object end in the lens driving apparatus; an image capturing element, provided at the opposite end of the cover glass in the optical axial direction putting the lens in the lens driving apparatus therebetween; and an iris, fixed onto the lens holder holding said lens while providing a linear motion thereto in the optical axial direction in the lens driving apparatus.

In the thin camera of the present invention, the lens driving portion can be made thinner, which makes thinning of the overall apparatus possible. Further, the lenses can be held without power supply, which provides a power saving camera eliminating the need for a constant power supply. Moreover, the iris is fixed onto the lens holder providing linear motion. The iris is thus automatically built into the apparatus as the iris is fixed onto the lens holder before assembling the lens holder. The assembly of the iris is thus made efficient. In addition, the iris is built therein utilizing its original alignment that is perpendicular to the plane of the guiding shafts of the lens holder, providing an easy way of aligning the iris perpendicular to the plane of the optical axis.

Yet another thin camera of the present invention comprises two or more lens holders, provided to vary the distance between lenses during zooming, and an iris, fixed onto the image capturing element end of a lens holder arranged toward the object end. Since an iris is fixed onto the lens holder at the image capturing element end in this invention, it shields light that is transmitted by the lens of the zooming mechanism at the object end, which is further transmitted through the portion of the lens that is not fully functional. This means that only light that is correctly refracted by the lens at the object lens is led to the lens toward the image capturing element.

A cellular phone having the camera of the present invention adopts a thin camera to a camera portion thereof and a board for connecting an image capturing element is arranged between the image capturing element and the back of the casing wherein the surface of the cover glass in the thin camera is leveled with the surface of the casing; the thickness between the cover glass surface and the back of the image capturing element in the thin camera is set to 6–10 mm.

A cellular phone with a camera has a flat compact camera portion about 6–10 mm thick measured from the surface of the cover glass to the back of the image capturing element. This allows reduction of the overall thickness of the cellular phone. Further, the lens position can be kept as is without conducting electricity all the time, which provides an energy saving type cellular phone with a camera. Moreover, a board for connecting an image capturing element is arranged between the back of the imaging element and the back of the casing. The board thus protects the image capturing element, enhancing the life and reliability thereof.

BRIEF DESCRIPTION OF THE DRAWINGS

FIGS. 4(A), (B), and (C) are cross sections of the lens driving apparatus of Embodiment 3 of the present invention wherein FIG. 4(A) illustrates the lens positioned in the wide angle mode at an initial position; FIG. 4(B) illustrates the lens in the standard mode; and FIG. 4(C) illustrates the lens in the zooming mode.

FIGS. 5(A), (B), (C), and (D) illustrates the lens driving apparatus of FIG. 4 wherein FIG. 5(A) is a diagram illustrating the first guiding channel provided at the outer circumference of the first lens holder; FIG. 5(B) is a diagram illustrating the first guiding channel developed in the circumferential direction; FIG. 5(C) is a diagram illustrating the second guiding channel provided at the outer circumference of the second lens holder; and FIG. 5(D) is a diagram illustrating the second guiding channel developed in the circumferential direction.

FIG. 7 is a diagram illustrating the status of channels provided on a rotor in the lens driving apparatus of FIG. 6 wherein FIG. 7(A) shows the image of a channeled ring; and FIG. 7(B) is a diagram showing the behavior of each of the lenses corresponding to each channel.

FIG. 8 is a cross section describing the behavior of each of the lenses whose torque is converted into linear motion by a switching mechanism wherein FIG. 8(A) shows the positional relationships of each of the lenses in the zooming mode; FIG. 8(B) shows the positional relationships of each of the lenses in the standard mode; and FIG. 8(C) shows positional relationships of each of the lenses in the zooming mode.

FIG. 9 is a diagram illustrating the stationary lens in the lens driving apparatus of FIG. 6 wherein FIG. 9(A) is a A—A cross section thereof and FIG. 9 (B) is a plan view thereof.

FIG. 10 is a diagram showing the movable lens at the object end in the lens driving apparatus of FIG. 6 wherein FIG. 10(A) includes both A—A cross section and C—C cross section thereof and FIG. 10(B) is a plan view thereof.

FIG. 11 is a diagram showing the movable lens at the CCD end in the lens driving apparatus of FIG. 6 wherein FIG. 11(A) includes both A—A cross section and C—C cross section thereof and FIG. 11(B) is a plan view thereof.

DETAILED DESCRIPTION OF THE INVENTION

Figure 1:
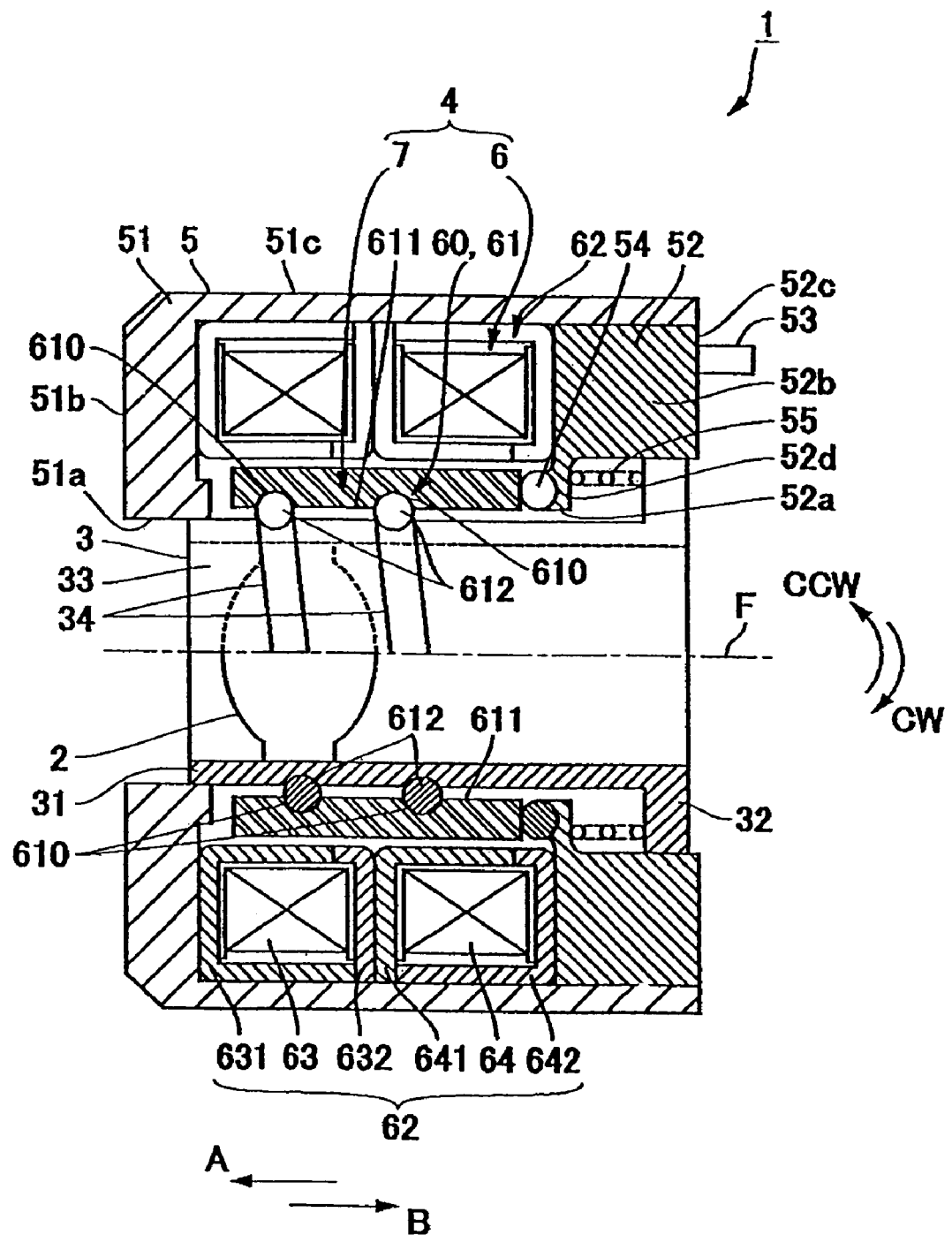
FIG. 1 is a cross sectional view illustrating the lens driving apparatus of Embodiment 1 of the present invention.

FIG. 1 is a cross sectional view of the lens driving apparatus associated with Embodiment 1 of the present invention.

As illustrated in FIG. 1, lens driving apparatus 1 drives lens 2 in a thin camera mounted onto a cellular phone or the like equipped with a camera. Lens driving apparatus 1 comprises: a cylindrical holder 3 having a lens 2; a driving mechanism 4 for driving lens holder 3 in both directions (A), toward the object, and (B), away from the object, along the optical axis (F) of lens 2; and casing 5 for housing lens holder 3 and driving mechanism 4.

Casing 5 is constructed with casing body 51 and casing lid 52 that fits into casing body 51 in the direction along the optical axis (F). Casing body 51 has edge 51b having opening 51a for moving lens holder 3 toward the center and cylindrical drum 51c extending from the outer circumference of edge 51b. Casing lid 52 has opening 52a for moving lens holder 3 toward the center and disk portion 52b that fits cylindrical drum 51c of casing body 51. Terminal 53 is attached to the outer edge 52c of disk portion 52b to supply power to driving apparatus 4.

At one end of opening 52a of disk portion 52a, bearing ball 54 is attached and step portion 52d is provided at the other end thereof.

In casing 5, driving mechanism 4 is housed between edge 51b of casing body 51 and disk portion 52b of casing lid 52. Lens holder 3 is inserted from opening 52a of casing lid 52 pointing toward opening 51a of casing body 51.

Lens holder 3 is constructed with a cylindrical portion 31 holding lens 2 at the inner circumference thereof and a flange 32 formed at the end of cylindrical portion 31. Cylindrical portion 31 is given an outer diameter that allows it to slide along the inner circumference of opening 51a of casing body 51. Flange 32 is shaped to fit step 52d of casing lid 52. Coil spring 55 is inserted between flange 32 and step 52d in such a manner that coil spring 55 is pinched therebetween.

FIGS. 2(A) and (B) are diagrams illustrating the switching mechanism configured for the lens driving apparatus of FIG. 1.

In this embodiment, driving mechanism 4, which surrounds lens holder 3 along its outer circumference, comprises an electromagnetic mechanism 6 for generating the torque around the optical axis (F); and a switching mechanism 7, which converts a torque generated by electromagnetic mechanism 6 into linear motion along the optical axis (F) of lens holder 3.

Electromagnetic mechanism 6, whose structure is identical to that of a PM type stepping motor, comprises: a rotor 60, which is a ring-like magnet 61 whose outer circumference is magnetized in the circumferential direction; and a stator 62, which faces the outer circumference of ring-like magnet 61.

Magnet 61, surrounding lens holder 3 by its outer circumference, is magnetized to provide multiple polarities thereon.

Stator 62 has a first driving coil 63 and a second driving coil 64, both of which are arranged along the optical axial direction. First driving coil 63 is sandwiched between first outer stator core 631 and first inner stator core 632. On first outer stator core 631 and first inner stator core 632, multiple poles are formed alternately along the inner circumference of first driving coil 63. Similarly, second driving coil 64 is sandwiched between second outer stator core 641 and second inner stator core 642. On second outer stator core 641 and second inner stator core 642, multiple poles are formed alternately along the inner circumference of second driving coil 64.

Rotor 60 is rotatably supported by bearing ball 54 around the optical axis (F) and lens holder 3 is pushed by coil spring 55 in direction (B). Magnet 61 and lens holder 3 are mechanically coupled via switching mechanism 7 described later. Rotor 60 is rotatably supported by the supporting means, which is comprised of bearing ball 54, coil spring 55, and switching mechanism 7 while its linear motion along the optical axis (F) is regulated.

The rotary motion of lens holder 3 in the optical axial direction is prevented by a rotation prevention means, which is comprised of a flange 32 and a rectangular portion on casing 5 that receives flange 32 and similar means.

Figure 2:
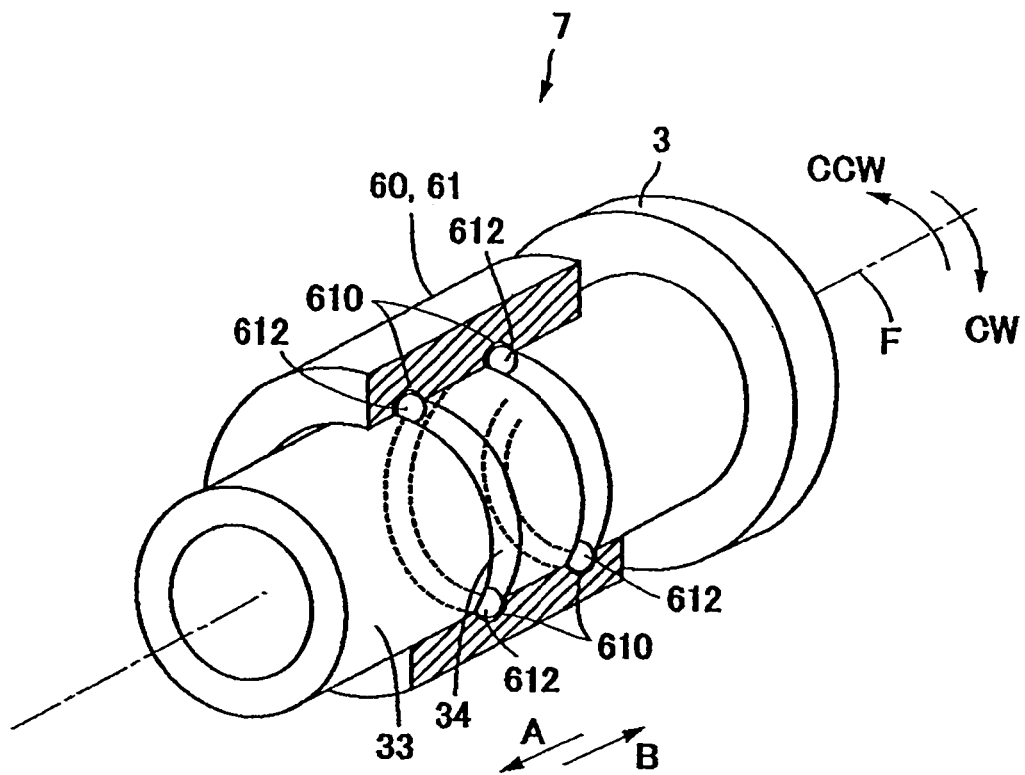
FIGS. 2(A) and (B) are diagrams illustrating the switching mechanism configured for the lens driving apparatus of FIG. 1.
Figure 2:
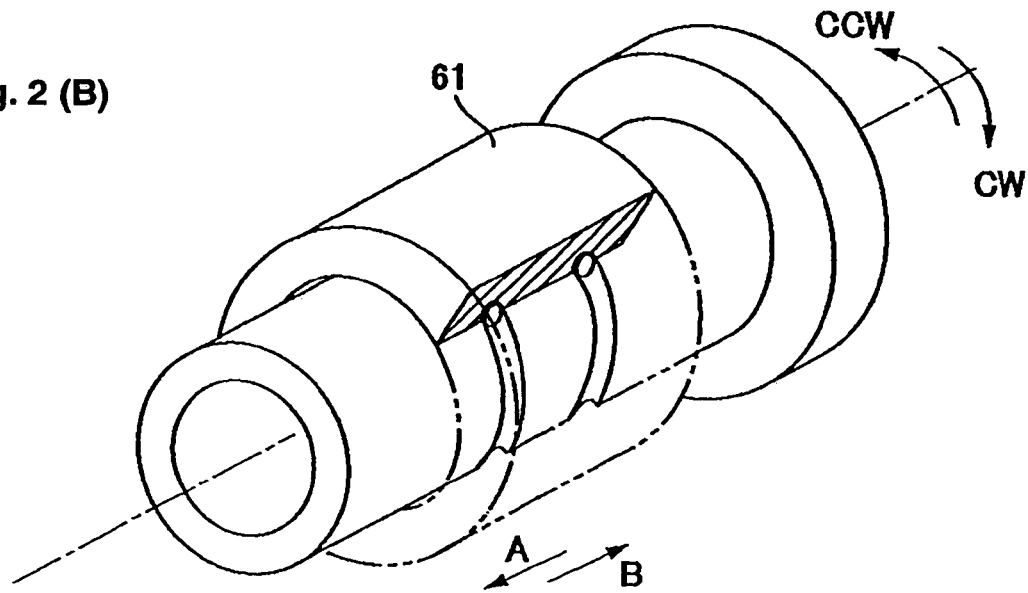

In FIGS. 1 and 2, switching mechanism 7 has spiral channel 34 (guiding channel), which is provided on outer circumference 33 of lens holder 3, and projection 612 (engagement means), which is held by inner circumference 611 of rotor 60 (magnet 61). Projection 612 is inserted in spiral channel 34. In this embodiment, there are at least three projections 612, which are circumferentially arranged at three different points on rotor 60.

Projection 612 may be integrally formed with rotor 60 as long as it is held by inner circumference 611 of rotor 60 to be inserted into spiral channel 34. This embodiment adopts a steel ball (spherical member) for projection 612, which is rotationally supported by concavity 610 formed on the inner circumference of rotor 60.

In switching mechanism 7 thus configured in FIG. 2(A), a clockwise (CW) rotary motion of rotor 60 (magnet 61) guides projection 612 of rotor 60 within spiral channel 34. As the rotary motion of lens holder 3 around the optical axis (F) is regulated by casing 5, lens holder 3 does not rotate but makes linear motion in direction (A) along the optical axis (F). A counterclockwise (CCW) rotary motion of magnet 61 induces a linear motion of lens holder 3 in direction (B) along the optical axis (F) without rotating lens holder 3.

Usually, lens 2 in lens driving apparatus 1 is driven by turning on first driving coil 63 and second driving coil 64 to rotate rotor 60 (magnet 61) in a CW or CCW direction, thereby causing switching mechanism 7 to move lens holder 3 in direction (A) to place lens 2 toward the object, or in direction (B) to place lens 2 away from the object. After lens 2 stops at a given position, first driving coil 63 and second driving coil 64 are turned off.

In lens driving apparatus 1 of this embodiment thus configured, driving mechanism 4 is arranged such that it surrounds lens holder 3 along its outer circumference. As a result, lens driving apparatus 1 can be made smaller than the driving mechanism arranged at a side of lens holder 3.

In this embodiment, a torque generated by electromagnetic mechanism 6 is converted to a linear driving force along the optical axis (F) via switching mechanism 7 to let lens holder 3 move in a linear fashion. This configuration prevents lens holder 3 from being displaced in the optical axis (F) when an external force or vibration is applied thereto in the same direction. Lens holder 3 is thus held at a given position without supplying power to electromagnetic mechanism 6.

Further, electromagnetic mechanism 6 has the structure of the stepping motor, which allows the detent-torque acting on the point between stator 62 and rotor 60 to also prevent lens holder 3 from being displaced by an external force in the optical axial direction. The lens holder 3 is thus correctly kept at a given position without supplying power to the electromagnetic mechanism. The position of lens 2, can be accurately controlled in the optical axial direction (F) only by controlling the number of steps of stator 62 upon power supply.

Further, in this embodiment, the presence of switching mechanism 7 provided between lens holder 3 and rotor 60 eliminates the need for rotating lens holder 3, utilizing casing 5 for regulating the rotary motion of lens holder 3. Lens 2 is thus moved in the direction of optical axis (F) without rotating it around the optical axis in this embodiment. Moreover, an engagement means 612 causes lens holder 3 to make linear motion by relatively moving within spiral channel 34. This allows optimization of the amount lens holder 3 moves or enhances the positioning accuracy in the optical axial direction only by adjusting the inclination angle of spiral channel 34 to the optical axis during rotation of rotor 60.

Further, in this embodiment, a spherical member is adopted for projection 612 in such a manner that it is rotatably held by the inner circumference of rotor 60. The spherical member, which is projection 612, thus functions as a bearing as well, providing efficient linear motion of lens holder 3.

To provide switching mechanism 7 in Embodiment 1, spiral channel 34 (guiding channel) is provided on outer circumference 33 of lens holder 3 so as to hold projection 612 (engagement means) by inner circumference 611 of rotor 60. Alternatively, however, spiral channel 34 (guiding channel) may be provided on the inner circumference of lens holder 3 and projection 612 (engagement means) may be held by inner circumference 611 of rotor 60.

Figure 3:
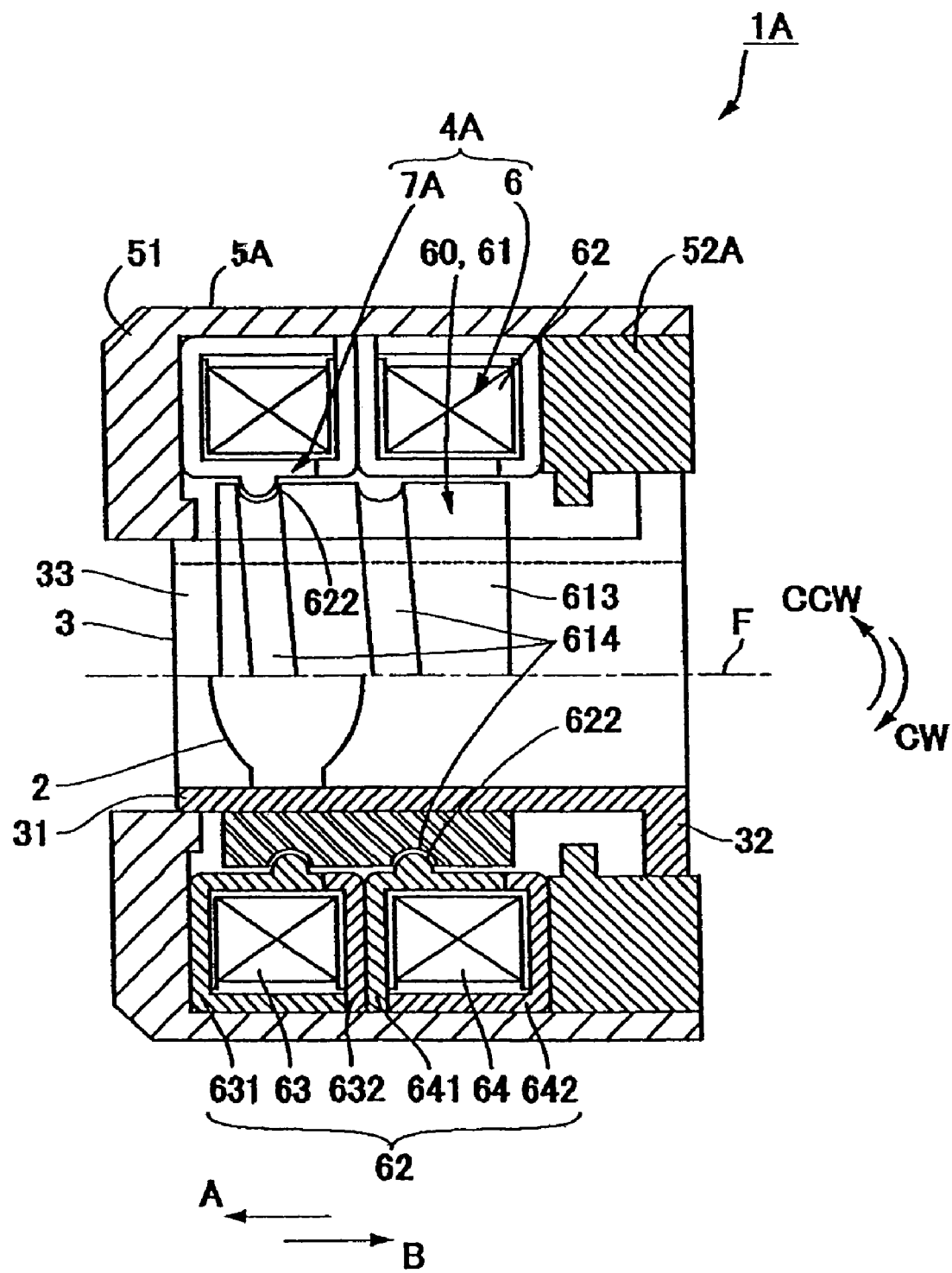
FIG. 3 is a cross sectional view illustrating the lens driving apparatus of Embodiment 2 of the present invention.

FIG. 3 is a cross section illustrating the lens driving apparatus associated with Embodiment 2 of the present invention. Note that the basic configuration of Embodiment 2 is the same as that of Embodiment 1; therefore, common components are not described herein.

As illustrated in FIG. 3, lens driving apparatus 1A of this embodiment comprises: a cylindrical lens holder 3 having lens 2; a driving mechanism 4A, which moves lens holder 3 along the optical axis (F) of lens 2 in direction (A), toward the object, and in direction (B), away from the object; and casing 5A, which houses lens holder 3 and driving mechanism 4A.

Casing 5A is constructed with casing body 51 and casing lid 52A that fits into casing body 51 in the direction along optical axis (F).

Casing body 51A houses driving mechanism 4A between the space defined by casing body 51 and casing lid 52A, in which lens holder 3 is arranged sharing the same shaft.

In this embodiment, driving mechanism 4A for moving lens holder 3, which surrounds lens holder 3 by its outer circumference, is constructed with an electromagnetic mechanism 6 for generating a torque around optical axis (F), and a switching mechanism 7A, which converts a torque generated by electromagnetic mechanism 6 into a linear driving motion along the optical axis (F) to provide a linear motion to lens holder 3.

Electromagnetic mechanism 6, whose structure is identical to that of a PM type stepping motor, has a rotor 60, which is a ring-like magnet 61 whose outer circumference is magnetized in the circumferential direction, and stator 62, facing the outer circumference of ring-like magnet 61.

Magnet 61, which surrounds lens holder 3 along its outer circumference, is magnetized to provide multiple polarities thereon.

In this embodiment, rotor 60 is formed integral with lens holder 3.

Stator 62 has first driving coil 63 and second driving coil 64, both of which are arranged along the optical axial direction in a manner similar to Embodiment 1. First driving coil 63 is sandwiched between first outer stator core 631 and first inner stator core 632. On first outer stator core 631 and first inner stator core 632, multiple poles are formed alternately along the inner circumference of first driving coil 63. Similarly, second driving coil 64 is sandwiched between second outer stator core 641 and second inner stator core 642. On second outer stator core 641 and second inner stator core 642, multiple poles are formed alternately along the inner circumference of second driving coil 64.

Here, rotor 60 and stator 62 are mechanically coupled via switching mechanism 7A described later. Rotor 60, together with lens holder 3, is rotatable around the optical axis (F) with respect to stator 62 and also movable along optical axis (F).

In this embodiment, switching mechanism 7A has spiral channel 614 provided on outer circumference 613 of rotor 60 and projection 622 (engagement means) held by the inner circumference of stator 62. Projection 622 is inserted in spiral channel 614. Projection 622 may be integrally formed with stator 62 as long as it is held by inner circumference 62 while being inserted into spiral channel 614, which is the case of this embodiment. However, a steel ball (spherical member) may be used instead, as long as it is rotatably held in a concavity provided on the inner circumference of stator 62, which is the case in Embodiment 1.

In switching mechanism 7A thus configured, a CW rotary motion of rotor 60 (lens holder 3) guides projection 622 of stator 62 within spiral channel 614 as the rotary motion of rotor 60 (lens holder 3) moves in direction (A) along optical axis (F). A CCW rotary motion of magnet 61 induces linear motion of rotor 60 (lens holder 3) in direction (B) along optical axis (F).

Usually, lens holder 3 is shifted by turning on first driving coil 63 and second driving coil 64 to rotate rotor 60, magnet 61, and lens holder 3 in a CW or CCW direction in lens driving apparatus 1A, thereby causing switching mechanism 7A to move lens holder 3 to place lens 2 in direction (A), toward the object, or direction (B) to place lens 2 away from the object. After lens 2 stops at a given position, first driving coil 63 and second driving coil 64 are turned off.

In lens driving apparatus 1 of the present invention, driving mechanism 4A surrounds lens holder 3 at its outer circumference, which provides an advantage in that the size of lens driving apparatus 1 of the present invention can be smaller than that of the lens driving mechanism having lens holders at its side. It also converts a torque generated by electromagnetic mechanism 6 into a linear motion along the optical axis (F) via switching mechanism 7A to let lens holder 3 make a linear motion. Electromagnetic mechanism 6 also has the stepping motor structure; as a result, a detent-torque is generated at the point between stator 62 and rotor 60 even though power supply to electromagnetic mechanism 6 is discontinued. This detent torque together with switching mechanism 7A prevent lens holder 3 from being displaced when an external force in the optical axial direction or vibration is acted thereon. Lens holder 3 is thus surely held at a given position without supplying power to electromagnetic mechanism 7. The position of lens 2 in the optical axial direction (F) can be adjusted only by controlling the number of steps upon power supply to stator 62. Effects similar to Embodiment 1 are thus obtained.

Lens holder 3 and rotor 60 are integrally formed in this embodiment, therefore, the number of components and the assembly steps can be reduced.

In Embodiment 2, to provide a switching mechanism 7A, spiral channel 614 was provided on outer circumference 613 (outer circumference of magnet 61) of rotor 60 and projection 622 (engagement means) was held by the inner circumference of stator 62. Alternatively, however, a spiral channel (guiding channel) 614 may be provided on the inner circumference of stator 62 and a projection (engagement means) may be held by the outer circumference (outer circumference of magnet 61).

The present invention is applicable to single or multiple lenses. When it is applied to multiple lenses, multiple lenses may be held by a common lens holder or each of the lenses may be held by separate holders.

When each of the lenses are held by separate lens holders, it is desirable that each of the lens holders holding lenses is arranged in the optical axial direction and each of the lens holders has a separate switching mechanism. This configuration provides different motions for different lenses.

Figure 4:
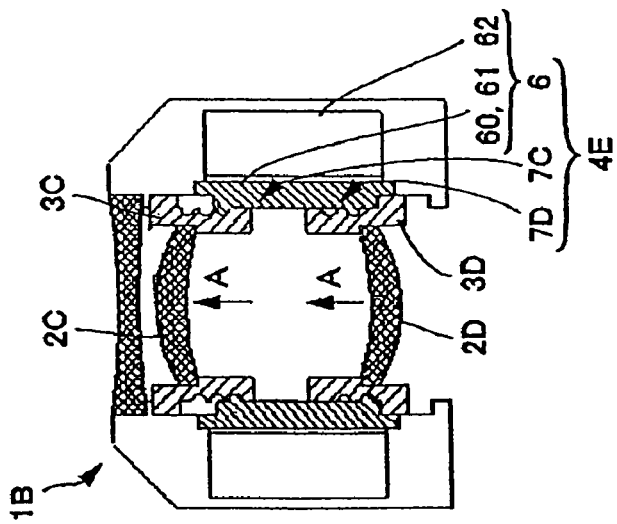
Figure 4:
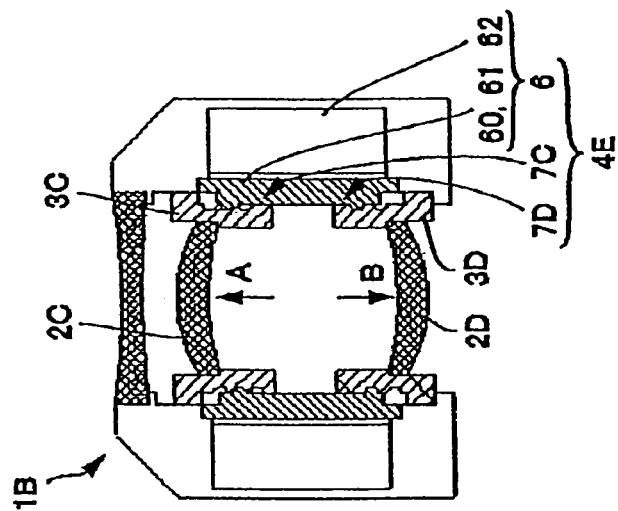
Figure 4:
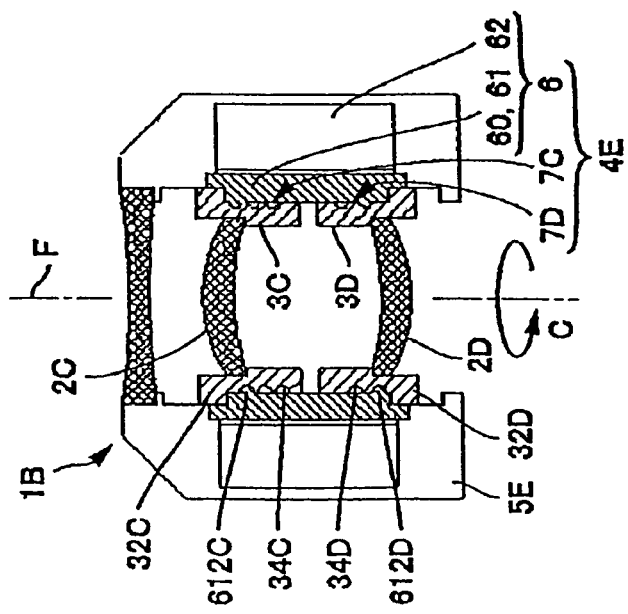
Figure 5:
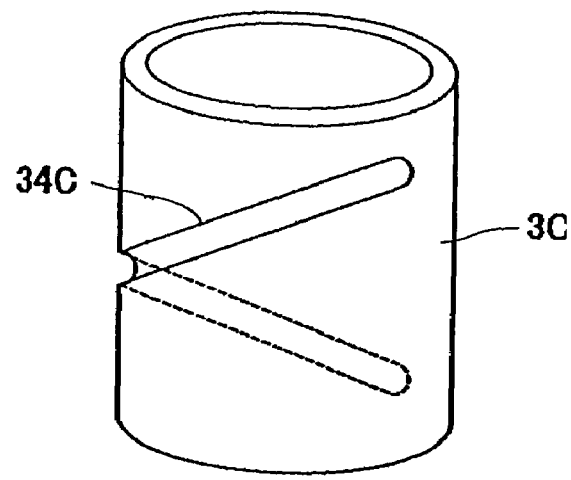
Figure 5:
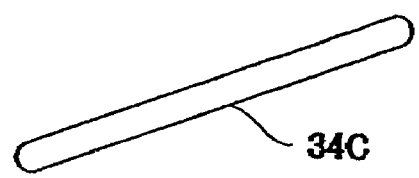
Figure 5:
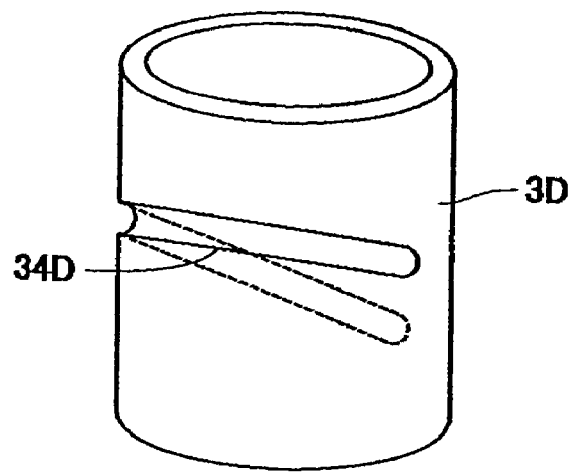
Figure 5:

FIGS. 4(A), (B), and (C) illustrate the lens driving apparatus of Embodiment 3 of the present invention. FIG. 4(A) is a cross section of the lens driving apparatus in the wide angle mode (origin); FIG. 4(B) is a cross section thereof in the standard mode; FIG. 4(C) is a cross section thereof in the zooming mode. FIG. 5(A), (B), (C), and (D) illustrate the lens driving apparatus 1 of FIG. 4 wherein FIG. 5(A) is a diagram illustrating the first guiding channel provided on the outer circumference of the first lens holder; FIG. 5(B) is a diagram illustrating the first guiding channel developed in a circumferential direction; FIG. 5(C) is a diagram illustrating the second guiding channel provided on the outer circumference of the second lens holder; and FIG. 5(D) is a diagram illustrating the second guiding channel developed in a circumferential direction. Note that the basic components of the lens driving apparatus of this embodiment is common to those of Embodiment 1, therefore, they are not described or drawn in detail.

As illustrated in FIG. 4(A), lens driving apparatus 1B is designed to independently drive two lenses in a thin camera mounted on a cellular phone with a camera and the like. Lens driving apparatus 1B comprises a cylindrical first lens holder 3C having first lens 2C provided at an object end; a cylindrical second lens holder 3D having second lens 2D at the opposite end of the object; a driving mechanism 4E for moving two lens holders 3C and 3D in direction (A), toward an object along the optical axis (F) of lenses 2C and 2D; and cylindrical casing 5E housing lens holders 3C, 3D, and driving mechanism 4E.

In this embodiment, the rotary motion of lens holders 3C and 3D around the optical axis (F) is prevented by a rotation prevention means made up with flanges 32C 32D and the rectangular portions on casing 5E that receive flanges 32C and 32D.

Driving mechanism 4E, surrounding lens holders 3C and 3D at its outer circumference, comprises a common electromagnetic mechanism 6 for generating a torque around optical axis (F); and switching mechanisms 7C and 7D, each of which converts a torque generated by electromagnetic mechanism 6 into linear motion along optical axis (F), thereby independently providing linear motion to the two lens holders 3C and 3D.

Electromagnetic mechanism 6, whose structure is identical to that of a PM type stepping motor, has rotor 60, which is a ring-like magnet 61 whose outer circumference is magnetized in a circumferential direction, and stator 62, which faces the outer circumference of ring-like magnet 61.

Magnet 61, which surrounds lens holder 3 at its outer circumference, is magnetized to provide multiple polarities thereon. Stator 62 is provided with a driving coil, outer stator core, inner stator core and poles in the same manner as Embodiment 1.

Rotor 60 is rotatably supported by a supporting means, which is a step in casing 5E in such a manner that its motion along optical axis (F) is regulated.

In this embodiment, switching mechanism 7C and 7D shares a basic structure: first switching mechanism 7C has first guiding channel 34, which is provided on the outer circumference of lens first lens holder 3C, and projection 612C (engagement means) held by the inner circumference of rotor 60 (magnet 61). Second switching mechanism 7D has second guiding channel 34D, which is provided on the inner circumference of lens second lens holder 3D, and second projection 612D (engagement means) held by the inner circumference of rotor 60 (magnet 61). Second projection 612D is inserted into second guiding channel 34D.

In switching mechanisms 7C and 7D configured in the above manner, a rotary motion of rotor 60 (magnet 61) guides projections 612C and 612D of rotor 60 within guiding channels 34C and 34D. In addition, the rotary motions of lens holders 3C and 3D are regulated by casing 5E. Lens holders 3C and 3D thus make linear motion along optical axis (F).

In this embodiment, as illustrated in FIGS. 5(A) and (B), first guiding channel 34C extends in a slanting manner in an extended view; second guiding channel 34D is an arc having a peak in an extended view as illustrated in FIGS. 5(C) and (D).

In FIGS. 5(A) and (B), guiding channels 34C and 34D are formed within 360°, which is an entire circle. In FIG. 4, guiding channels 34C and 34D for two cycles are illustrated to clarify the operation of switching mechanisms 7C and 7D. Note that it is desirable that guiding channels 34C and 34D are provided within 360°, however, they may be provided in a range larger than 360°.

As the driving coil is turned on to rotate rotor 60 (magnet 61) in direction (C) in driving apparatus 1B configured in the above manner, switching mechanism 7C causes first lens holder 3C and first lens 2C to move in direction (A) toward the object while causing second lens holder 3D and second lens 2D to move in direction (B) away from the object, which is the standard mode illustrated in FIG. 4(B). When the driving coil is turned on to further rotate rotor 60 (magnet 61) in direction (C), switching mechanism 7C causes first lens holder 3C and first lens 2C to move in direction (A) toward the object while causing second lens holder 3D and second lens 2D to return in direction (A) toward the object, which is the zooming mode illustrated in FIG. 5(C).

When the driving coil is turned on and rotor 60 (magnet 61) is rotated in a reversed manner, the zooming mode illustrated in FIG. 5(C) returns to wide angle mode as illustrated in FIG. 5(A) via a standard mode as illustrated in FIG. 5(B). As lenses 2C and 2D reach a given point during the reversed rotation, the driving coil is turned off.

In lens driving apparatus 1B of the present invention, driving mechanism 4E surrounds lens holders 3C and 3D at its outer circumference, which provides an advantage in that the size of lens driving apparatus 1B of the present invention can be smaller than that of the lens driving mechanism 1E having lens holders 3C and 3D at its side. It also converts a torque generated by electromagnetic mechanism 6 into a linear motion along optical axis (F) via switching mechanism 7C and 7D to let lens holders 3C and 3D make linear motion. Lens holders 3C and 3D are thus surely held at a given position without supplying power to electromagnetic mechanism 6. Effects similar to Embodiment 1 are thus obtained.

Two lens holders 3C and 3D are provided to hold lenses 2C and 2D in this embodiment. Further, switching mechanisms 7C and 7D are provided for each of the lens holders 3C and 3D while different channel patterns are given to different guiding channels 34C and 34D. Lenses 2C, 2D and lens holders 3C, 3D are thus independently driven.

The lens driving apparatus associated with another embodiment of the present invention is described herein with reference to the FIGS. 6–11. A thin type camera and a cellular phone with a camera (hereinafter referred to as a "cellular camera phone") are described in the description of the lens driving apparatus.

Figure 6:
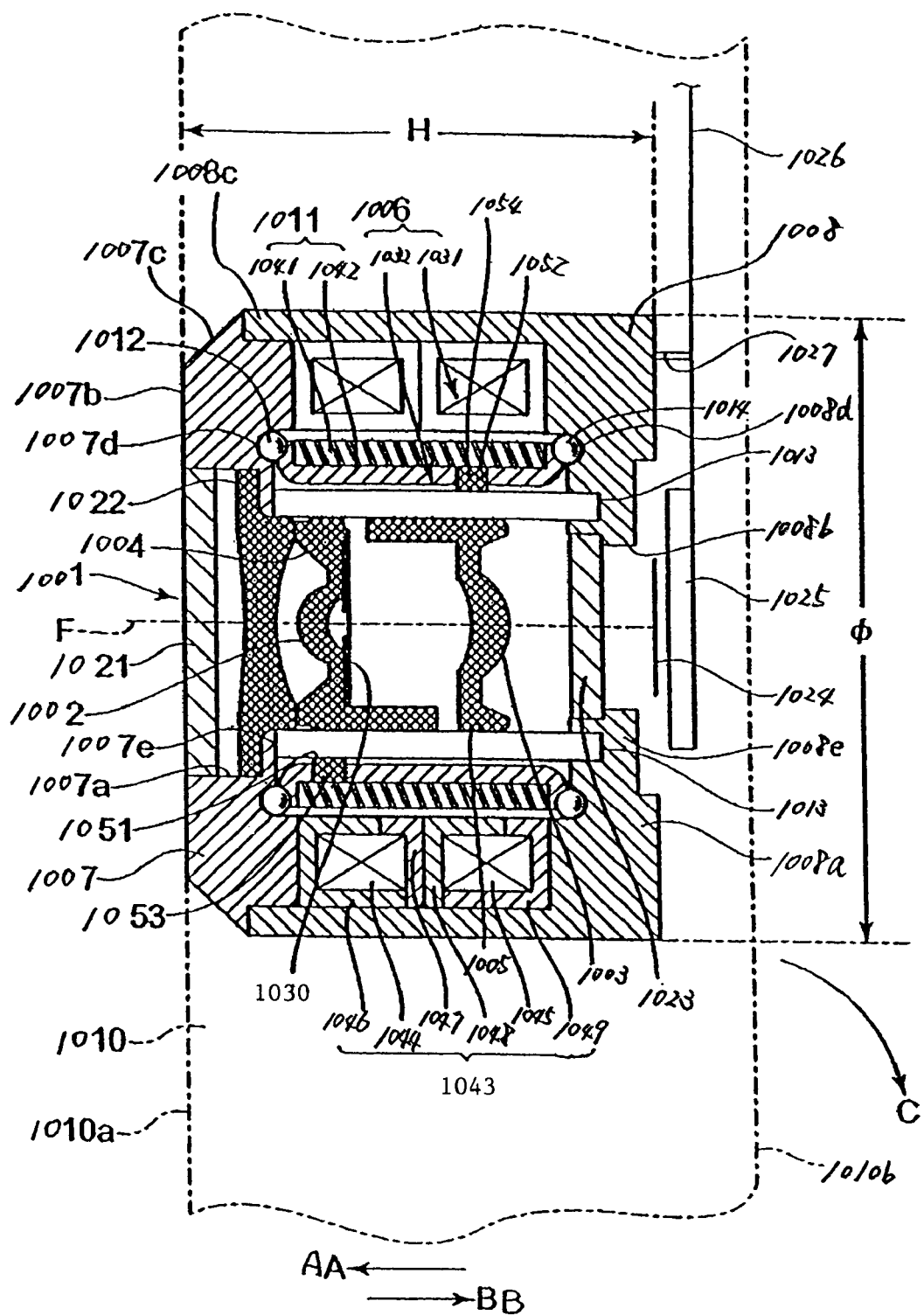
FIG. 6 is a cross sectional view illustrating the lens driving apparatus and a thin camera according to another embodiment of the present invention.

FIG. 6 is a cross section of the lens driving apparatus associated with another embodiment of the present invention.

As illustrated in FIG. 6, lens driving apparatus 1001 is the type built into a thin camera installed in cellular camera phone 1010 and dives multiple lenses 1002, 1003 arranged therein. Lens driving apparatus 1001 comprises: multiple lenses 1002, 1003; donut-like (donut-shaped) lens holder 1004 having lens 1002 in the center thereof; another donut-like (donut-shaped) lens holder 1005 having lens 1003 in the center thereof; driving mechanism 1006, which moves lens holders 1004, 1005 in direction (A), toward the object, or direction (B), away from the object along optical axis (F); and casing body housing lens holders 1004, 1005 and driving mechanism 1006.

The casing body is constructed with front end casing 1007 and rear end casing 1008 which is fitted to front end casing 7 from the direction along optical axis (F). Front end casing 1007 has edge 1007 having a circular opening 1007a at the center thereof for introducing the light from an object; conical inclined portion 1007c provided at the outer circumference of edge 1007b; ring-like ball bearing 1007b on which bearing ball 1012 for receiving one end 1007b of rotor 1011 (details of this are described later); and donut-like guide supporting portion for supporting one end of guiding shaft 1013 (details of this are described later).

Rear end casing 1008 comprises: disk-like back portion 1008a; circular opening 1008b, provided at the center of back portion 1008a for guiding the light from an object; cylindrical drum 1008c, extending from the outer circumference of rear portion 1008a toward the object end so as to fit into the outer circumference of front end casing 1007; ring-like ball receiving portion 1008d having bearing ball 1014 to receive the other end of rotor 1011; guide holding portion 1008e supporting guiding shaft 1013 which is inserted therein and surrounds the outer circumference of opening 1008b.

Bearing balls 1012 are circularly arranged in ball bearing portion 1007d, which is a circular channel, without any space between the balls. Bearing balls 1014 are arranged in ball bearing portion 1008d, which is also a circular channel, with no space therebetween.

Driving mechanism 1006 is housed in the casing body. In other words, driving mechanism 1006 is housed between the edge 1007b of front end casing 1007 and the back 1008a of rear end casing lid 1007. An optical system for image capturing is arranged between opening 1007a of front end casing 7 and opening 1008b of rear end casing 1008.

Cellular camera phone 1010 illustrated in FIG. 6 is a folding type, which is folded in direction (C) as marked with an arrow. A part of the thin camera (covering glass 1021 and the edge of front end casing 1007) is exposed on top of the folded phone, which is the back of the unfolded phone. Cover glass 1021 is arranged at the front end of the optical system and the image capturing optical system is arranged inside the cover glass 1021.

The image capturing optical system is a zooming type. Viewed from the object end, it is constructed with stationary lens 1022, and movable lens 1002, provided toward the object end, and another movable lens 1003, provided at the image capturing element end. The zooming optical system is a triplet having a zooming ratio of 2, a focal length of 2–4 mm, horizontal angle of view of 53°–28°, and an F-value of 3.5–5.3. On the opposite side of the object of lens 1003 are arranged, in the optical axial direction (F), filter 1023, image capturing element 1024, and circuit board 1025 to be connected to image capturing element 1024. Disk-like iris 1030 having a circular hole in the middle is fixed onto the surface of lens 1002 toward image capturing element 1024.

Cover glass 1021 is provided in such a manner that its front surface shares the same plane and is level with edge 1007b of front end casing 1007 and the surface of cellular camera phone. The cover glass 1021 prevents the image capturing optical system from external contamination (e.g., dust). Stationary lens 1022 is an aspherical resin lens comprising a center lens component, which works as a lens; and a lens holder component, which is integrally formed with the lens component to hold the lens by the outer circumference of the lens. The lens component has two concave surfaces, together providing a concave lens. The outer circumference of the lens touches guide support 1007e; the lens holder component with a small diameter is fitted into a circular hole, which is defined by the outer end of guide support 1007e.

Lens 1002 is an aspherical convex lens of an integral body (described later) projecting toward the object end. Lens holder 1004 for supporting lens 1002 and lens holder 1004 are integrally molded to give an integral body (described later) made of the same resin material. The overall integral body has a disk shape. Lens 1003 is an aspherical convex lens of an integral body (described later) projecting toward the image capturing element end. Lens holder 1005 for supporting lens 1003 and lens 1003 are also integrally molded to give an integral body (described later) made of the same resin material. This overall integral body is given a disk shape as well.

Filter 1023 cuts out light of given frequencies with reference to those detected by image capturing element 1024. Image capturing element 1024, which is a charged couple device (CCD), sends detected signals to circuit board 1025. Detected signals are, then, sent to a controller (e.g., microcomputer) (not illustrated) via flexible board 1026.

In a thin camera of this type, the height (H) measured from the surface of cover glass 1021 to the back of CCD 1025 is set to 7.5 mm. An (H) of 5 mm or larger provides for easy assembly of the zooming mechanism; an (H) of 10 mm or less allows a thinner cellular camera phone 1010 even though circuit board 1025 is arranged between the back of CCD 1024 and the back of the casing of cellular camera phone 1010.

Moreover, the diameter (Ø) of this thin camera is set to 10 mm. A (Ø) of 8 mm or more means that the diameter of driving mechanisms 1006 can be bigger, which greatly improves maneuverability thereof. It also enhances the performance of lenses 1002 and 1003. A (Ø) of 15 mm or less has a great advantage of reduction of the camera size, which qualifies the camera for installation in compact equipment such as cellular phones, mobile computers, personal digital assistant (PDA) terminals, and the like.

In this embodiment, driving mechanisms 1006, which surrounds lens holders 1004 and 1005 at its outer circumference, are constructed with an electromagnetic mechanism 1031 for generating a torque around optical axis (F), and switching mechanisms 1032, which convert a torque generated by electromagnetic mechanism 1031 into linear motion along optical axis (F) for holders 1004 and 1005.

Electromagnetic mechanism 1031, whose structure is identical to that of a PM type stepping motor, comprises a ring-like magnet, whose outer circumference is N/S alternatingly magnetized to provide multiple polarities thereon; a rotor 1011, which is made up with a ring 1042 having a tubular channel; and a stator 1043, which faces the outer circumference of ring-like magnet 1041.

The overall rotor 1011 is shaped like a cylinder and is arranged such that its outer circumference surrounds lens holders 1004 and 1005. Rotor 1011 is made by insert plastic molding such that magnet 1041 and channeled ring 1042 are integrally secured to rotate together.

Stator 1043 comprises: a first driving coil 1044 and second driving coil 1045, both of which are arranged along the optical axial direction. First driving coil 1044 is wrapped around the outer circumference of poles in a donut shape, being sandwiched between first outer stator core 1046 and first inner stator core 1047. On first outer stator core 1046 and first inner stator core 1047, multiple poles are alternately formed along the inner circumference of first driving coil 1044.

Similarly, second driving coil 1045 is also wrapped around with the outer circumference of poles in a donut shape being sandwiched between second inner stator core 1048 and second outer stator core 1049. On second inner stator core 1048 and second outer stator core 1049, multiple poles are formed alternately along the inner circumference of second driving coil 1045.

Here, rotor 1011 is rotatably supported by bearing balls 1012 and 1014 around optical axis (F). Rotor 1011 and lens holders 1004, 1005 are mechanically coupled to each other via switching mechanism 1032 described herein. Rotor 1011, in this configuration, is supported by the supporting means made up with bearing balls 1012, 1014, 1007*d* and 1008*d* in such a manner that it is capable of rotating around the optical axis while its linear motion along the optical axis (F) is regulated. In this embodiment, the support means for rotor 1011 is constructed with bearing balls 1012 and 1014, and ball bearings 1007*d* and 1008*d*. Moreover, lens holders 1004 and 1005 act as rotation prevention means, which prevent the rotational motion of lens holders 1004 and 1005 around the optical axis as guiding shaft 1013, which is also a guiding means, is inserted therein.

The structure and operation of switching mechanism 1032 is described herein with reference to FIGS. 7–11.

FIGS. 7(A)–(B) are diagrams showing channels 1051 and 1052 provided on ring 1042 arranged on the inner circumference of rotor 1011. FIG. 7(A) illustrates the image of ring 1042 having channels and FIG. 7(B) illustrates motions of each of the lenses 1002, 1003, 1022 corresponding to each of channels 1051 and 1052.

Figure 7:
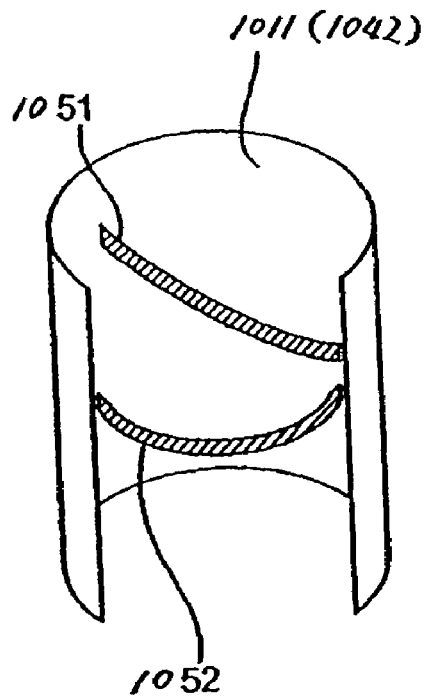
Figure 7:
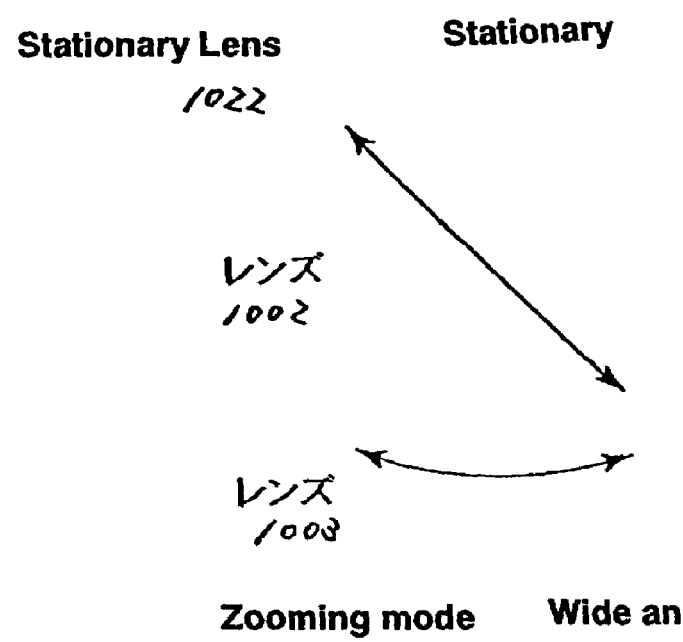

As illustrated in FIGS. 6 and 7, switching mechanism 1032 comprises two channels (guiding channels) 1051 and 1052, provided on the inner circumference of rotor 1011, which is a channeled ring 1042; and projections 1053 and 1054 provided on the outer circumference of lens holders 1004 and 1005. Projection 1053 is inserted into channel 1051 and projection 1054 is inserted into channel 1052.

Figure 8:
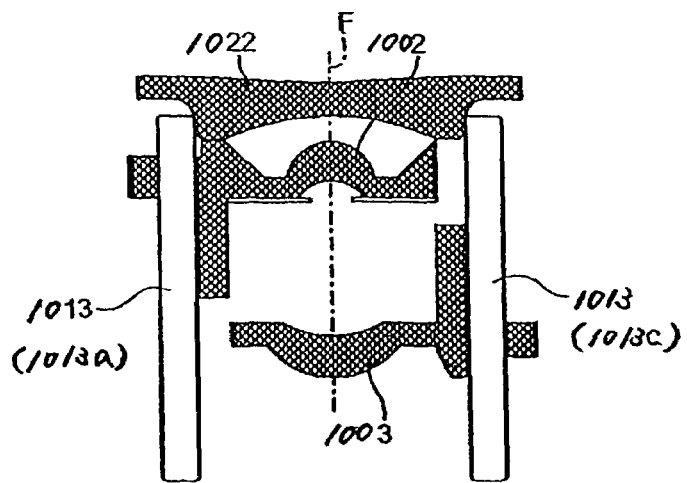
Figure 8:
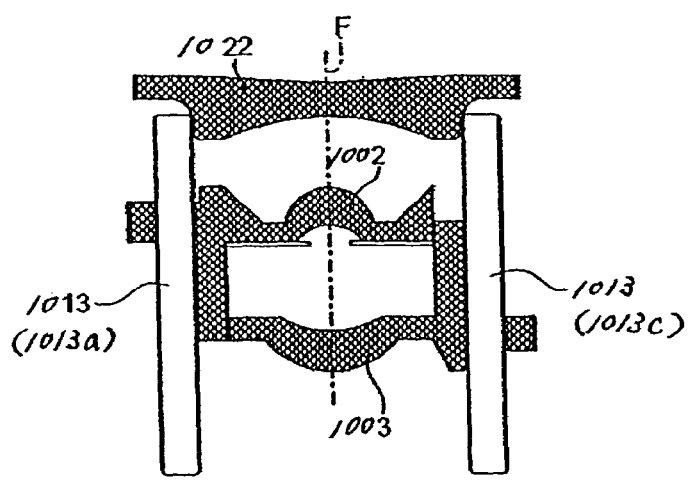
Figure 8:
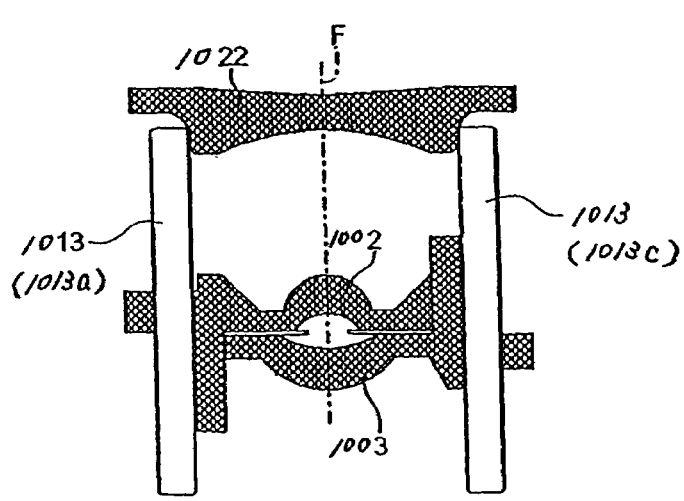

FIGS. 8(A)–(C) are cross sections illustrating the operation of each of the lenses 1002 and 1003, which executes linear motion via switching mechanism 1032. FIG. 8(A) shows the positional relationship of each of the lenses 1002, 1003, and 1022 in the zooming mode; FIG. 8(B) shows the positional relationship of each of the lens 1002, 1003, and 1022 in the standard mode; and FIG. 8(C) shows the positional relationship of each of the lenses 1002, 1003, and 1022 in the wide angle mode. As is apparent from FIGS. 7 and 8, stationary lens 1002 is stationary; lenses 1002 and 1003 execute linear motion along optical axis (F) as rotor 1011 rotates. Details of this motion are described later.

Figure 9:
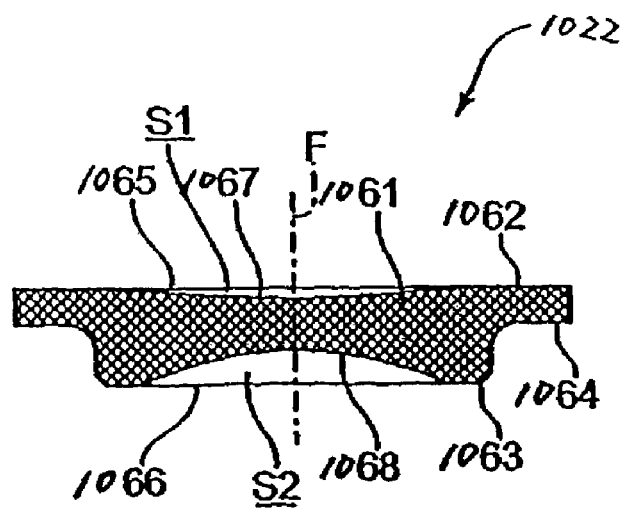
Figure 9:
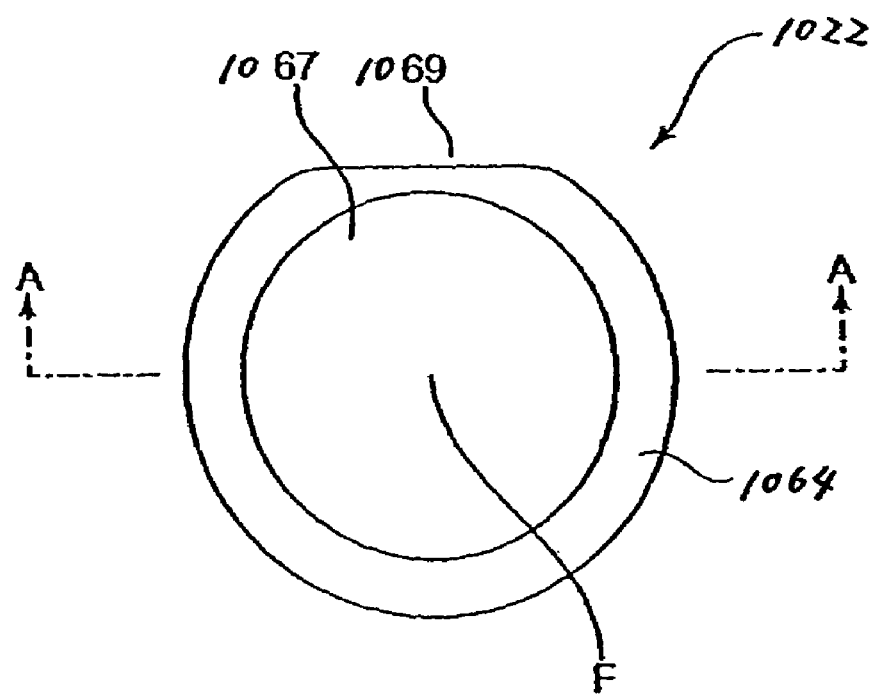
Figure 10:
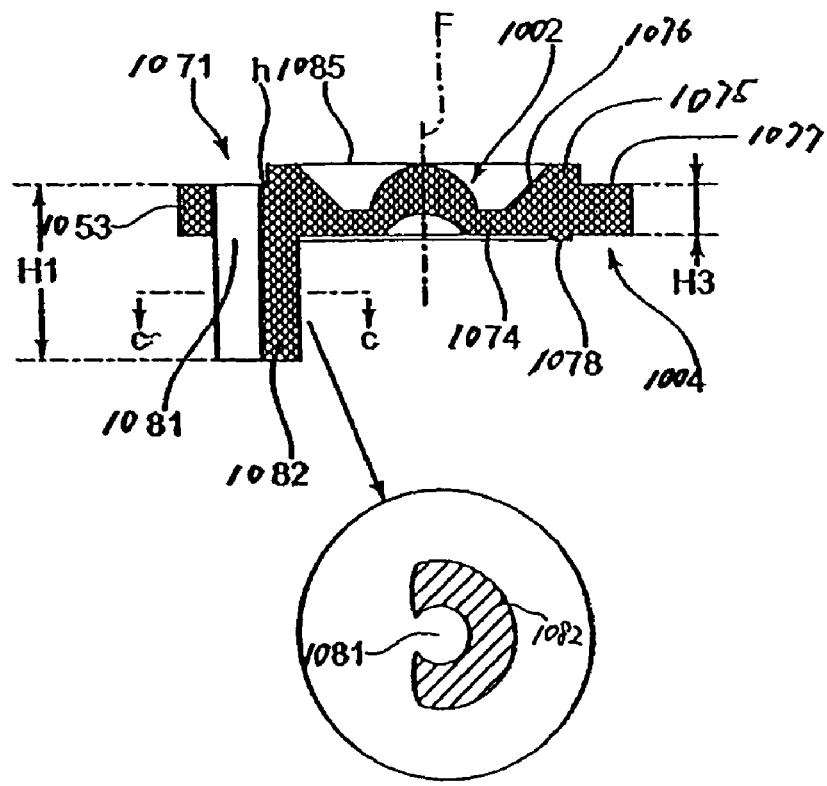
Figure 10:
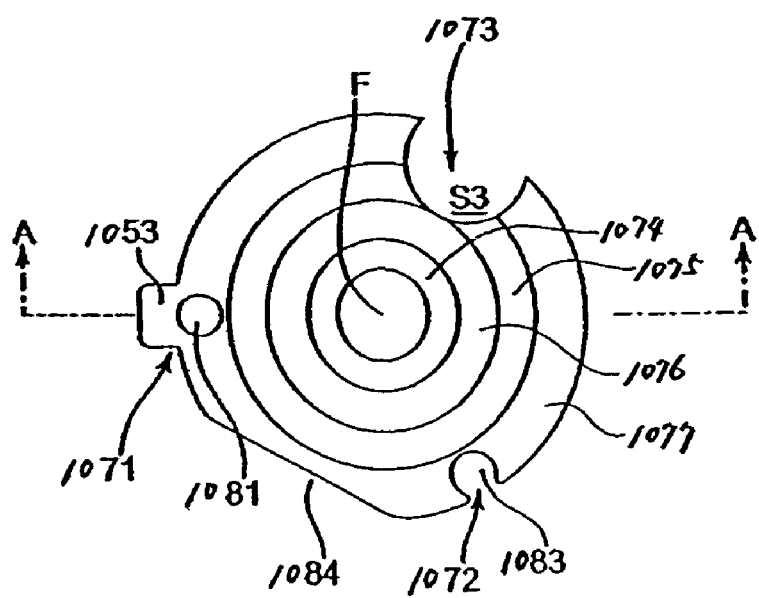
Figure 11:
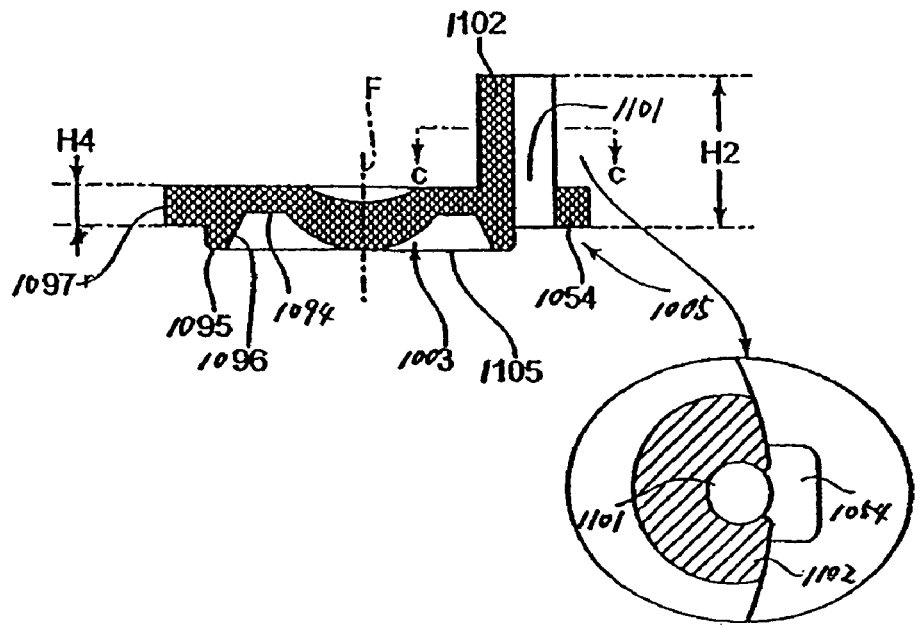
Figure 11:
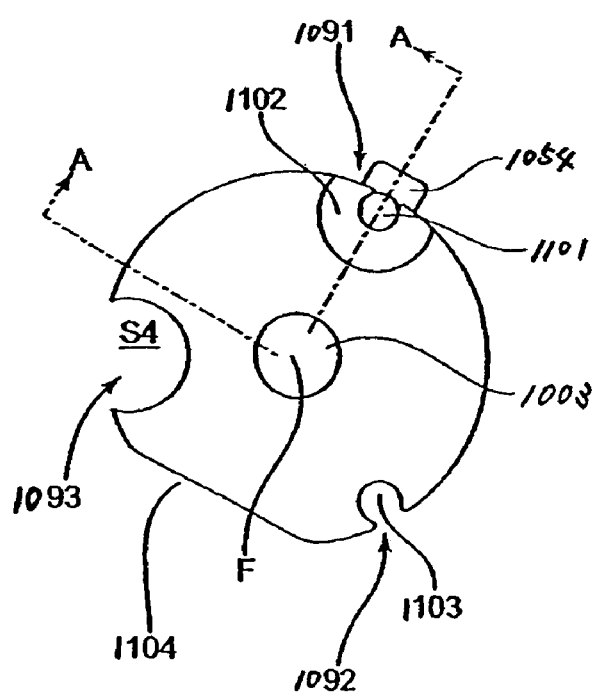

FIGS. 9-11 are cross sectional (FIGS. 9(A), 10(A) and 11(A)) and plan views (FIGS. 9(B), 10(B) and 11(B)) of each of the lenses 1022, 1002, and 1003. Stationary lens 1022 made of resin comprises: a circular lens portion 1061 whose two surfaces are concave; and a donut-shaped lens holder 1062 surrounding lens portion 1061. Lens holder 1062 is constructed with a fitting portion 1063, whose thickness continuously increases from lens portion 1061; and an engagement portion 1064, which is the thinner outer circumference of fitting portion 1063. Since fitting portion 1063 is thick and lens portion 1061 is thin and concave, spaces S1 and S2 are created between virtual horizontal planes 1065, 1066 of fitting portion 1063 and lens surfaces 1067, 1068 of lens portion 1061. Notch 169, a linear flatness, is provided at a part of engagement portion 1064. Notch 1069 is the entry point for resin injection.

Stationary lens 1022 is fixed onto guide holder 1007*e* in such a manner that engagement portion 1063 mates with the opening defined by guide support 1007*e*; and engagement portion 1064 mates with opening 1007*a* and touches guide support 1007*e*, where stationary lens 1022 latches with guide holder 1007*e*.

The integral body of lens 1002 and lens holder 1004 has, as illustrated in FIG. 10, a hemispherical lens 1002 to be aspherical resin lens in the center thereof and lens holder 1004 continuously formed in a donut shape on the outer circumference of lens 1002. Lens holder 1004 comprises: two engagement portions 1071 and 1072 which are guides that prevent rotary motion; an escaping portion 1073, its presence is not for guiding or stopping lens holder's rotary motion; and projection 1053 provided near engagement portion 1071, which is one of the two engagement portions to be inserted into channel 1051. Even though engagement portion 1072 guides and brakes rotary motion of lens holder 1004, its major role is to stop rotary motion and marginally guides lens holder 1004.

Engagement portion 1071 has a rod-like sliding portion 1082 with a through hole through which guiding shaft 1013 (first of the three guiding shafts 1013, hereinafter referred to "guiding shaft 1013*a*") is inserted therein to guide and break rotary motion thereof. Sliding portion 1082 projects toward CCD 1024 end in such a manner that the direction of its projection and the center axis are in parallel with optical axis (F).

Engagement portion 1072 has a rod-like sliding portion 1082 with a through hole through which guiding shaft 1013 (second of the three guiding shafts 1013, hereinafter referred to "guiding shaft 1013*b*") is inserted to guide and break a rotary motion thereof. The portion that slides on guiding shaft 1013*b* provides the sliding portion on engagement portion 1072.

0052

Escaping portion 1073, which is a notch, providing space S3 is formed in such a manner that the last of the three guiding shafts 1013 (hereinafter referred to as "guiding shaft 1013*c*") is inserted therethrough and along sliding portion 1102 (described later) provided at the lens 1003 end. Escaping portion 1073 does not guide or stop rotary motion thereof.

Lens holder 1004 comprises a thin coupling portion 1074 surrounding lens 1002; a thick wall 1075 around outer circumference of coupling portion 1074; a taper 1076, which is a conical declining surface connecting coupling portion 1084 and wall 1075; an outer circumference 1077 having a half thickness of each coupling portion 1074 and a wall 1075; and ring-like projection 1078 surrounding iris 1030.

Three guiding shafts 1013 are arranged at an even spacing; similarly, two engagement portion 1071, 1072 and escaping portion 1073 are arranged in such a manner that the center of each component is 120° apart from the adjacent components. Through holes 1081 and notch 1083 are provided on outer circumference 1077. A notch for escaping portion 1073 is provided between outer circumference 1077 and wall 1075. A notch 1084 having a shape similar to notch 1069 is provided on a part of outer circumference 1077 to be used as an entry point for resin injection. In this embodiment, the height of lens 1002 is set in such a manner that the virtual horizontal plane of wall 1075 is level with the peak of the projection. However, the height of lens 1002 may be slightly higher or lower than virtual horizontal plane 1085.

The integral body of lens 1003 and lens holder 1005 is constructed with a hemispherical lens 1003 to be an aspherical lens being placed in center, and a donut-shaped lens holder 1005, which is continuously formed on the outer circumference of lens 1003. Lens holder 1005 comprises two engagement portion 1091 and 1092; an escaping portion 1093, which does not guide or break a rotary motion thereof; and projection 1054, provided near engagement portion 1091, which is one of the above two, to be inserted into channel 1052. The major role of engagement portion 1092 is to stop rotary motion thereof, rather than guiding the integral body in a manner similar to engagement portion 1072.

Lens holder 1005 further comprises a thin coupling portion 1094 surrounding lens 1003; a thick protecting portion 1095 being provided on the outer circumference of coupling portion 1094; a conical taper 1096 connecting coupling portion 1094 and protecting portion 1095; and outer circumference 1097 having a thickness that equals the mean of the thickness of portion 1094 and the thickness of protecting portion 1095.

Engagement portion 1091, through which guiding shaft 1013*c* is inserted, has long sliding portion 1102 having a through hole 1101 for guiding and stopping rotary motion thereof. Sliding portion 1091 projects toward the object (object end) in such a manner that the direction of its projection and the center axis of through hole 1101 are parallel to optical axis (F). Engagement portion 1092, which guiding shaft 1013*b* goes through, has a notch 1103 for guiding and stopping rotary motion thereof. The portion which slides on this guiding shaft 1013*b* of notch 1103 constitutes the sliding portion for engagement portion 1092. Escaping portion 1093 is provided in the form of a hole such that guiding shaft 1013*c* can go through sliding portion 1082 at the lens 2 end and can be inserted therein, thereby providing escaping space S4 for sliding portion 1082. Escaping portion 1093 does not guide or stop a rotary motion thereof.

Three guiding shafts 1013 are arranged at an even spacing; similarly two engagement portions 1091, 1092 and escaping portion 1093 are arranged in such a manner that the center of each component is 120° apart from the adjacent components. Through hole 1101 and notch 1103 both are provided on outer circumference 1097. A hole (notch) for escaping portion 1093 is provided between outer circumference 1097 and wall 1095. A notch 1084 having shape similar to notch 1084 is provided on a part of outer circumference 1097 to be used as an entry point for resin injection. In this embodiment, the height of lens 1003 is set in such a manner that the virtual horizontal plane of protecting portion 1095 is level with the peak of the projection thereof. However, the height of lens 1003 may be slightly higher or lower than virtual horizontal plane 1105.

Regarding long sliding portions 1082 and 1102, the length is enough to prevent each of the lenses 1002 and 1003 from taking a declining position to or falling from guiding shafts 1013*a* and 1013*c*. This configuration allows each of the lenses 1002 and 1003 to execute linear motion in such a manner their centers move along optical axis (F) as lenses 1002 and 1003 execute linear motion in the direction of optical axis (F). The sliding portions for engagement portion 1072 and 1092 are made short so as to prevent them from being twisted when they execute linear motion. In other words, guided linear motion is provided by long sliding portions 1082 and 1102; and engagement portions 1072 and 1092 find their roles in braking rotational motion of lenses 1002 and 1003. Notches 1083 and 1103, being cut out toward the center of engagement portions 1072 and 1092, find their roles in braking rotational motions of lenses 1002 and 1003 as described above. Energy loss is derived from friction and malfunctioning is thus prevented.

Heights H1 and H2 of long sliding portions 1082 and 1102 are 2–5 times greater than H3 and H4 of outer circumferences 1077 and 1097, which are the thicknesses of engagement portions 1072 and 1092. In this embodiment, H1:H3=23:6 while H2:H4=21:6. It is desirable that long sliding portions be 2–5 time higher than short sliding portions in view of preventing falling and twisting of lens 1003 from lens holder 1005. Particularly at 3–4 times, lens holder 1005 executes linear motion along optical axis (F) accurately while maintaining its position perpendicular to the plane of the optical axis.

The thickness of circumferences 1077 and 1097 of engagement portions 1072 and 1092 are thicker than that of coupling portions 1074 and 1094. This is required because lenses 1002 and 1003 are given as large a diameter as possible by making coupling portions 1074 and 1094 as thin as possible, which provides poor mechanical abrasion resistance. The presence of tapers 1076 and 1096 increases mechanical strength with their gradually declining surfaces; providing the greatest thickness to wall 1075 surely prevents lens 1002 from touching stationary lens 1022; and providing greatest thickness to protecting portion 1095 ensures lens 1003 from touching filter 1023.

In the structure illustrated in FIG. 6, channels 1051 and 1052 on channeled ring 1042 of rotor 1011 are through channels; channels 1051 and 1052 are provided all the way through ring 1042 such that one can observe magnet 1051 at the deep end of channels 1051 and 1052 when viewed from optical axis (F). However, channels 1051 and 1052 may be provided in the form of a concave groove without being channeled all the way to the end. Channeled ring 1042 is made of a resin material in this embodiment; however, it may be made of iron. A resin material has an advantage in that rotor 1011 can be molded by insert molding. Iron has an advantage in that channeled ring 1042 works like a rear yoke of magnet 1041, thereby enhancing the performance of electromagnetic mechanism 1031.

Guiding shaft 1013 is made of a metallic material but it may be made of a resin material. Both front end casing 1007 and rear end casing 1008 are made of a resin in this embodiment; however, they may be made of a metallic material. Moreover, H1 defines the distance sliding portion 1082 slides along guiding shaft 1013*a*. This is because there is a small gap (h) (See FIG. 10) between through hole 1081 and wall 1075. Long sliding portion 1102 of lens holder 1005, on the other hand, slides along guiding shaft 1013*c* with the height equal to H2 plus the projection of protection portion 1095. This configuration allows sufficient sliding distance even though H2 is less than H1.

During assembling of lens driving apparatus 1001, lenses 1002 and 1003 are built therein before assembling front end casing 1007 or guiding shafts 1013: stator 1043, filter 1023, or bearing ball 1014 are built into rear end casing 1008 before lenses 1002 and 1003 are built into the inner space surrounded by rotor 1011. The largest diameter of an integral body constructed with projection 1053 and lens 1002 or that of another integral body constructed with projection 1053 and lens 1003 is slightly smaller than the inner diameter of rotor 1011, as a result, each of the integral bodies can be built into rotor 1011.

During assembly, an integral body having projection 1054 is inserted into the very end of lens driving apparatus 1001 until projection 1054 reaches the point facing channel 1052, when the integral body is moved aside such that projection 1054 can be inserted into channel 1052. Then, another integrated body having projection 1053 is inserted into rotor 1011 until projection 1053 reaches the point facing channel 1051, when the integral body moves aside such that projection 1053 can be inserted into channel 1051.

Then, three guiding shafts 1013 are inserted into each of the integral bodies, and one end of guiding shafts 1013 are press fitted to rear end casing 1008 to provide a pillar. Then, front end casing is fitted into rear end casing 1008 in such a manner that bearing ball 1012 is held at a given position. Stationary lens 1022 is then assembled therein, followed by cover glass 1021, which is the final component.

Next, operation of lens driving apparatus 1001 thus configured and a thin camera are described herein.

When the thin camera is turned off, the camera stands by in a zooming position as illustrated in FIG. 8(A). As the imaging switch (not illustrated) is turned on, power is supplied to electromagnetic mechanism 1031 from a power source (not illustrated) via flexible board 1026, terminal 1027 (the portion projecting from the longitudinal edge of rear end casing 1028 toward flexible board 1026). Stator 1043 is then excited to rotate rotor CW viewed from the object end. The torque is converted to linear motion by switching mechanism 1032, thereby moving lens 1002 close to stationary lens 1022 (in direction (AA) in FIG. 6).

Usually, lens 1002 does not move because the tip of engagement portion 1063 of stationary lens 1022 touches wall 1075 of lens holder 1004. Nonetheless, engagement portion 1063 does not touch wall 1075 due to vibration, and the like. Wall 1075 moves toward stationary lens 1022 until it touches fitting portion 1063. The above operation thus provides the initial position. Alternately, the operation may provide the standard position in FIG. 8 (B) or wide angle position in FIG. 8(C). The lens may stand by at the standard position (FIG. 8(B)) or the wide range position (FIG. 8(C)). When the camera stands by in the wide angle position, it is desirable that its initial position is obtained at the wide angle end.

After the initial position is obtained, rotor 1011 rotates CCW viewed from the object end. As a result, lenses 1002 and 1003 together are moved (in linear motion) away from the object until they stop at the standard position shown in FIG. 8(B). At this stage, channel 1051 toward lens 1002 end declines sharper, lens 1002 moves further backward from the object than lens 1003.

As lens 1002 stops at the standard image capturing position shown in FIG. 8(B), long sliding portion 1082 toward lens 1002 enters escaping space S4 of escaping portion 1093 toward lens 1003, therefore, sliding portion 1082 does not collide with lens holder 1005 toward lens 1003. At this stage, a very small gap exists between the outer circumference of sliding portion 1082 and the inner circumference of escaping portion 1093 therefore; linear motion is not interrupted at all. On the other hand, long sliding portion 1102 toward lens 1002 also enters escaping space S3 of escaping portion 1073 toward lens 1002, as a result, sliding portion 1102 does not collide with lens holder 1004 toward lens 1002 either. Herein, a very small gap exists between the outer circumference of sliding portion 1102 and the inner circumference of escaping portion 1073; therefore, linear motion is not affected.

The standard position allows image capturing by making a shutter (not illustrated) operable. A user operates a zooming button (not illustrated) to move lens 1002 and 1003 in the zooming or wide angle direction. To move these lenses 1002 and 1003 in the zooming direction, rotor 1011 is rotated CW viewed from the object end; to move these lenses 1002 and 1003 in the wide angle direction, rotor 1011 is rotated CCW viewed from the object end.

As a given magnification is set, the camera is ready to capture an image of the object by pressing the shutter (not illustrated) to capture the image of the object. During image capturing, the image captured by CCD 1024 is detected and processed by CCD 1024. The camera may be designed assuming that the image capturing button is pressed to put the camera in the standby mode when image capturing is completed. However, this thin camera is designed to switch the camera mode into standby without pressing the image capturing button again. In the standby mode, power is not supplied to electromagnetic mechanism 1031; and lenses 1002 and 1003 are held at the latest point. Controller (not illustrated) saves the number of steps that exist between the initial position and the last point, which is the latest position of lenses 1002 and 1003.

In this way, lens 1002 and 1003 quickly move to a given position when the mode is switched from standby to image capturing. In addition, no power is required for holding lenses 1002 and 1003 during the standby mode, providing a camera of the energy saving type. If the image capturing button is pressed to turn the camera off, the camera is completely turned off, not in the standby mode. Turning off the camera also holds off electrical conduction to electromagnetic mechanism 1031, however, immediately before electrical conduction thereof is terminated, rotor 1011 rotates CW, viewed from the object, to move lenses 1002 and 1003 to the zooming position. As inactivation of electromagnetic mechanism 1031 is detected by the controller, the camera is completely shut off.

The camera is controlled as described above in this embodiment, however, it may be controlled in such a manner that power supply to electromagnetic mechanism 1031 is terminated while lenses 1002 and 1003 are held at the latest position as they are. It is desirable that the camera obtains its initial position in case that the button is pressed for capturing an image. Nonetheless, the controller may move lenses 1002 and 1003 in accordance with the index (data) of lenses 1002 and 1003 saved therein.

In lens driving apparatus 1001 or thin type camera of the embodiment described above, electromagnetic mechanism 1031 surrounds lens holders 1004 and 1005 at its outer circumference. The size of lens driving apparatus and the camera can be much more compact than the configuration in which a driving means, specifically an electromagnetic mechanism, is arranged at the sides of lens holders 1004 and 1005. Lens driving apparatus 1001 or thin-type camera can be very symmetric in a radial direction, providing good anti-vibration characteristics. Further, the presence of guiding shafts improves lens positioning accuracy, particularly positioning accuracy in the circumferential or horizontal direction.

Further in this embodiment, a torque generated by switching mechanism 1032 is converted into linear motion along the optical axis to move lens holders 1004 and 1005. Even though an external force is applied to lens holders 1004, 1005 in the optical axial direction (F) when power supply to the electromagnetic mechanism is discontinued, switching mechanism 1032 mechanically prevents lens holders 1004 and 1005 from displacement. Lens holders 1004 and 1005 are thus kept at a given position without supplying power to the electromagnetic mechanism.

Electromagnetic mechanism 1031 has the structure of a stepping motor. In this configuration, the detent-torque acting on the point between stator 1043 and rotor 1011 also prevents lens holders 1004 and 1005 from being displaced by an external force applied thereon in the optical axial direction (F). The lens holders 1004 and 1005 are thus correctly kept at a given position without supplying power to electromagnetic mechanism 1031. The position of lenses 1002 and 1003 can be accurately controlled in the optical axial direction (F), only by controlling the number of steps of stator 1043 upon power supply.

Further in this embodiment, a switching mechanism is provided between lens holders 1004, 1005 and rotor 1011 including guiding shafts 1013 besides lens holders 1004 and 1005; as a result the thickness does not increase in a radial direction. Moreover, channels 1051, 1052, projections 1053, 1054, and three guiding shafts 1013 together can move lenses 1002 and 1003 in the optical axial direction (F), without rotation about optical axis (F). Furthermore, lens holders 1004 and 1005 move as projections 1053 and 1054 relatively move along channels 1051 and 1052. This allows optimization of the amount the lens holders 1004 and 1005 move or enhancement of the positioning accuracy of lens holders 1004 and 1005 in the optical axial direction (F) when rotor 1011 rotates, only by adjustment of the angle of inclination of the guiding channel with respect to the optical axis. A setting of this type also allows optimization of high power zooming.

The above are desirable embodiments of the present invention. However, a variety of modifications are possible as long as the spirit of the present invention remains the same. The example presented by the use of two movable lenses, 1002 and 1003, however, the present invention can be applied to the case in which a single lens or more than three lenses are used. Further, lens holders 1004 and 1005 may be made in the form of a cylinder and channels corresponding to 105 and 1052 may be provided on the outer circumference thereof while projections that correspond to 1053 and 1054 may be provided on the inner circumference thereof.

The above example was also represented by a single driving means, which is driving mechanism 1006; however, two or three driving mechanisms 1006 may be overlaid in an optical axial direction (F). In this case, it is desirable that all driving mechanisms 1006 share guiding shaft 1013. When two driving mechanisms 1006 are overlaid, it is desirable that driving mechanism 1006 toward the object end be used as a zooming mechanism while that toward CCD 1024 end is used as an auto focus mechanism, however, this arrangement may be reversed. Also in the above embodiment, switching mechanism 1032 converts torque into linear motion, however, switching mechanism 1032 may be eliminated. In this case, a moving coil type linear motor should be adopted for the electromagnetic mechanism to provide linear motion along the guiding shaft for lens holders 1004 and 1005.

Bearing balls 1012 and 1014 receiving both ends of rotor 1011 are arranged circularly with no gap therebetween. However, 3, 4, or 5 balls may be arranged at an even spacing, i.e., 120°, 90°, 72° respectively. Alternately, bearing balls 1012 may be arranged circularly at bearing ball 1012 end while bearing balls 1014 are arranged at a space at the bearing ball 1014 end. This arrangement relationship may be reversed. The use of circular bearing balls 1012 and 1014 mitigates frictions and provides a smooth rotation. The spaced arrangement of bearing balls 1012 and 1014 reduces slanting (of the lens holders), thereby stabilizing rotational motion and reducing manufacturing costs.

Also in the above embodiment, when projections 1053 and 1054 are inserted into channels 1051 and 1052, each of the integral bodies is first inserted into rotor 1011, and then moved horizontally in a direction perpendicular to the optical axis (F) to insert projections 1053 and 1054 into channels 1051 and 1052. However, insertion assisting channels which act as guides to channel 1051 and channel 1052 may be provided on the inner circumference of channeled ring 1042. In this case, projections 1053 and 1054 are first inserted in insertion assisting channels and move along the insertion assisting channels before being inserted into channels 1051 and 1052 required for a given zooming. When this configuration is adopted, lenses 1002 and 1003 can be assembled before and after guiding shaft 1013 is installed.

Channel ring 1042 does not necessarily need to have channels 1051 and 1052. Instead of providing channeled ring 1042, channels 1051 and 1052 may be directly provided on magnet 1041. Instead of integrating lenses 1002 and 1003 with lens holders 1004 and 1005, a separate lens holder 1004 may be attached to lens 1002; another separate lens holder 1005 may be attached to lens 1003; and projections 1053 and 1054 may be attached to lens holders 1004 and 1005 afterwards. Projections do not need to be fixed onto lens holders 1004 and 1005 or rotor 1011. An alternate configuration includes the use of a ball for a projection and a ball holder which rotatably supports a rocking ball.

When two lenses 1002 and 1003 move a zooming mechanism, three guiding shafts 1013 arranged 120° apart are desirable for guiding shafts 1013. However, when a rotation-stopper is provided by another means, two guiding shafts 1013 (1013a and 1013c) only may be used. When using only two guiding shafts 1013, they should be arranged symmetrically at 180°. When arranging multiple guiding shafts 1013, it is desirable that they be spaced evenly; however, they may be unevenly spaced.

Iris 1030 is made in the form of a thin circular plate having a circular hole in the center. However, it may be a thick plate. Alternately, a non-transmittive member may be deposited onto a part of lens 1002 or lens holder 1004, which may then be molded into the integral body of lens 1002 (and lens holder 1004). Further, iris 1030 may be provided at lens 1003 end or it may be fixed in the vicinity of filter 1023.

Desirably, electromagnetic mechanism 1031 is given the mechanism of a stepping motor as described above. However, when a movable lens needs to have two positional states only requiring a simple mechanism, a synchronous motor having only one driving coil or reluctance motor which does not require magnet 1041 may be adopted. To control positioning accurately, electromagnetic mechanism 1031 may be a stepping motor of the encoding type that detects the rotor position by the encoder method or by the counter electromotive force generated by the driving coil, or a DC brushless motor.

The above embodiment is an example in which lens driving apparatus 1001 is built into a cellular camera phone as its camera mechanism. However, the lens driving apparatus or a thin camera of this invention can be applied to other portable equipment such as mobile computer or PDA. It can further be built into other camera equipment such as a monitoring camera, medical camera and the like. It can also be built into a TV set or similar equipment.

As described, in the present invention, the driving means surrounds the lens holders at its outer circumference, which provides an advantage in that the lens driving apparatus of the present invention requires a smaller lens driving apparatus than that required for the lens driving apparatus having lens holders at a side thereof. In addition, the switching mechanism of the present invention switches the torque generated by the electromagnetic mechanism to a linear driving force along the optical axis. As a result, even though an external force is applied to the lens holders when power supply to the electromagnetic mechanism is discontinued, the switching mechanism prevents the lens holders from moving in the optical axial direction. The lens holders are thus kept at a given position without supplying power to the electromagnetic mechanism. Moreover, selecting the electromagnetic mechanism adopts a stepping motor mechanism, the detent-torque acting on a point between a stator and a rotor also prevents lens holder from being displaced as an external force is applied to the point in the optical axial direction. The lens holder is thus correctly kept at a given position without supplying power to the electromagnetic mechanism. The position of the lens can also be accurately controlled in the optical axial direction only by controlling the number of steps of the stator as power is supplied thereto.

The present invention provides improved positioning accuracy for a lens. It also provides a thin camera and a cellular camera phone whose size can be further reduced.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A lens driving apparatus comprising:
    a lens holder holding a lens; and
    driving means for providing linear motion to the lens holder along an optical axis of the lens;
    said driving means further comprising:
        an electromagnetic mechanism, provided at the outer circumference of the lens holder in an enclosing manner for generating a torque around the optical axis; and
        a switching mechanism for switching the torque generated by the electromagnetic mechanism to a linear driving force along the optical axis so as to linearly move the lens holder;
    wherein said electromagnetic mechanism comprises:
        a rotor having a ring-like magnet whose outer circumference is magnetized in a circumferential direction; and
        a stator, provided with multiple magnetic poles facing the outer circumference of the ring-like magnet.

2. The lens driving apparatus as set forth in claim 1 wherein said lens holder comprises multiple lens holders, each holding a lens and arranged in the optical axial direction wherein said switching mechanism is provided to each of said multiple lens holders.

3. The lens driving apparatus as set forth in claim 1 wherein
    said lens driving apparatus further comprises supporting means for rotatably supporting said rotor around the optical axis while limiting the linear motion of said lens holder along said optical axis;
    wherein said switching mechanism further comprises:
        a guiding channel provided on one of said lens holder's outer circumference and said rotor's inner circumference; and
        an engagement means, which is held at the other of said lens holder's outer circumference and said rotor's inner circumference, being inserted into said guiding channel to provide relative linear motion to said lens holder in the optical axial direction along said guiding channel as said rotor rotates.

4. The lens driving apparatus as set forth in claim 1 wherein said rotor is integrally formed with said lens holder; wherein said switching mechanism further comprises:
    a guiding channel provided on one of said lens holder's outer circumference and said rotor's inner circumference; and
    an engagement means, which is held at the other of said lens holder's outer circumference and said rotor's inner circumference, being inserted into said guiding channel to provide a relative linear motion to said lens holder in the optical axial direction along said guiding channel as said rotor rotates.

5. The lens driving apparatus as set forth in claim 3 wherein:
    said lens holder comprises a plurality of lens holders, each holding a lens; and said plurality of said lens holders holding said lenses are arranged in the optical axial direction and said switching mechanism is provided for each of said lens holders.

6. The lens driving apparatus as set forth in claim 5 wherein said switching mechanisms corresponding to different lens holders are given guiding channels of different patterns.

7. The lens driving apparatus as set forth in claim 3 wherein said engagement means is spherical and is rotatably held by the surface not selected previously for said guiding channel.

8. A lens driving apparatus comprising:
a lens holder holding a lens; and
a driving mechanism for providing linear motion to the lens holder along an optical axis of the lens;
said driving mechanism further comprising:
an electromagnetic mechanism, provided at the outer circumference of the lens holder in an enclosing manner for generating a torque around the optical axis; and
a switching mechanism for switching the torque generated by the electromagnetic mechanism to a linear driving force along the optical axis so as to linearly move the lens holder;
wherein said electromagnetic mechanism comprises:
a rotor having a ring-like magnet whose outer circumference is magnetized in a circumferential direction; and
a stator, provided with multiple magnetic poles facing the outer circumference of the ring-like magnet.

9. The lens driving apparatus as set forth in claim 8 wherein said lens holder comprises multiple lens holders, each holding a lens and arranged in the optical axial direction wherein said switching mechanism is provided to each of said multiple lens holders.

10. The lens driving apparatus as set forth in claim 8 wherein
said lens driving apparatus further comprises a supporting device for rotatably supporting said rotor around the optical axis while limiting the linear motion of said lens holder along said optical axis;
wherein said switching mechanism further comprises:
a guiding channel provided on one of said lens holder's outer circumference and said rotor's inner circumference; and
an engagement element, which is held at the other of said lens holder's outer circumference and said rotor's inner circumference, being inserted into said guiding channel to provide relative linear motion to said lens holder in the optical axial direction along said guiding channel as said rotor rotates.

11. The lens driving apparatus as set forth in claim 10 wherein:
said lens holder comprises a plurality of lens holders, each holding a lens; and
said plurality of said lens holders holding said lenses are arranged in the optical axial direction and said switching mechanism is provided for each of said lens holders.

12. The lens driving apparatus as set forth in claim 11 wherein said switching mechanisms corresponding to different lens holders are given guiding channels of different patterns.

13. The lens driving apparatus as set forth in claim 8 wherein said rotor is integrally formed with said lens holder; wherein said switching mechanism further comprises:
a guiding channel provided on one of said lens holder's outer circumference and said rotor's inner circumference; and
an engagement element, which is held at the other of said lens holder's outer circumference and said rotor's inner circumference, being inserted into said guiding channel to provide a relative linear motion to said lens holder in the optical axial direction along said guiding channel as said rotor rotates.

14. The lens driving apparatus as set forth in claim 10 wherein said engagement element is spherical and is rotatably held by the surface not selected previously for said guiding channel.

* * * * *